United States Patent
Walters et al.

(10) Patent No.: US 8,968,023 B1
(45) Date of Patent: Mar. 3, 2015

(54) ROTATABLE WIRING HARNESS FOR CABLE AND METHOD

(71) Applicants: James C Walters, Cresson, TX (US); Donald W. Murray, Arlington, TX (US); William H Moulton, III, Mansfield, TX (US)

(72) Inventors: James C Walters, Cresson, TX (US); Donald W. Murray, Arlington, TX (US); William H Moulton, III, Mansfield, TX (US)

(73) Assignee: WilliamsRDM, Inc., Fort Worth, TX (US)

( * ) Notice: Subject to any disclaimer, the term of this patent is extended or adjusted under 35 U.S.C. 154(b) by 35 days.

(21) Appl. No.: 14/020,804

(22) Filed: Sep. 7, 2013

Related U.S. Application Data

(60) Provisional application No. 61/863,598, filed on Aug. 8, 2013.

(51) Int. Cl.
  *H01R 13/58* (2006.01)
  *H02G 3/04* (2006.01)
  *H02G 1/00* (2006.01)

(52) U.S. Cl.
  CPC .............. *H02G 3/0406* (2013.01); *H02G 1/00* (2013.01)
  USPC ...................................................... 439/446

(58) Field of Classification Search
  USPC ............... 439/6, 11, 164, 446, 502, 598, 604, 439/902; 285/153.1, 154.1; 174/651
  See application file for complete search history.

(56) References Cited

U.S. PATENT DOCUMENTS

| | | | | |
|---|---|---|---|---|
| 4,583,797 | A * | 4/1986 | Engelmore et al. | 439/22 |
| 5,277,590 | A * | 1/1994 | Thomas et al. | 439/20 |
| 5,380,219 | A * | 1/1995 | Klier | 439/446 |
| 5,735,707 | A * | 4/1998 | O'Groske et al. | 439/446 |
| 5,882,226 | A * | 3/1999 | Bell et al. | 439/582 |
| 5,911,595 | A * | 6/1999 | Orr et al. | 439/471 |
| 6,081,422 | A * | 6/2000 | Ganthier et al. | 361/679.22 |
| 6,561,549 | B1 * | 5/2003 | Moris et al. | 285/184 |
| 6,932,390 | B1 * | 8/2005 | Gretz | 285/184 |
| 7,025,595 | B1 * | 4/2006 | Chan et al. | 439/6 |
| 7,074,087 | B2 * | 7/2006 | Szczesny et al. | 439/607.41 |
| 7,186,133 | B1 * | 3/2007 | Szczesny | 439/446 |
| 7,435,090 | B1 * | 10/2008 | Schriefer et al. | 439/13 |
| 8,108,787 | B2 * | 1/2012 | Finger et al. | 715/766 |
| 8,894,420 | B2 * | 11/2014 | Schichl et al. | 439/39 |

* cited by examiner

*Primary Examiner* — Vanessa Girardi
(74) *Attorney, Agent, or Firm* — Morani Patent Law, PC

(57) ABSTRACT

The wiring harness provided herein affords adjustability of the relative orientation between the connecting cable and its interface connector in real time, during field applications. The harness rotates to accommodate varying access angles to the desired test point connector. A cable conduit of the harness can be adjusted vertically relative to the axis of its interface connector, as well. Cable wire integrity is maintained during manipulations of the cable conduit relative to the harness electrical connector and stress on the wires is minimized. The harness can be sealed from moisture and environmental factors. The harness can provide shielding from electromagnetic interference for the cabling housed therein. The present harness is well suited for service in high heat environments in, for example, testing of aircraft systems. A cylinder receives the cabling conduit and swivels within a slotted backshell. Slot configuration can limit the translation of the cable conduit.

86 Claims, 28 Drawing Sheets

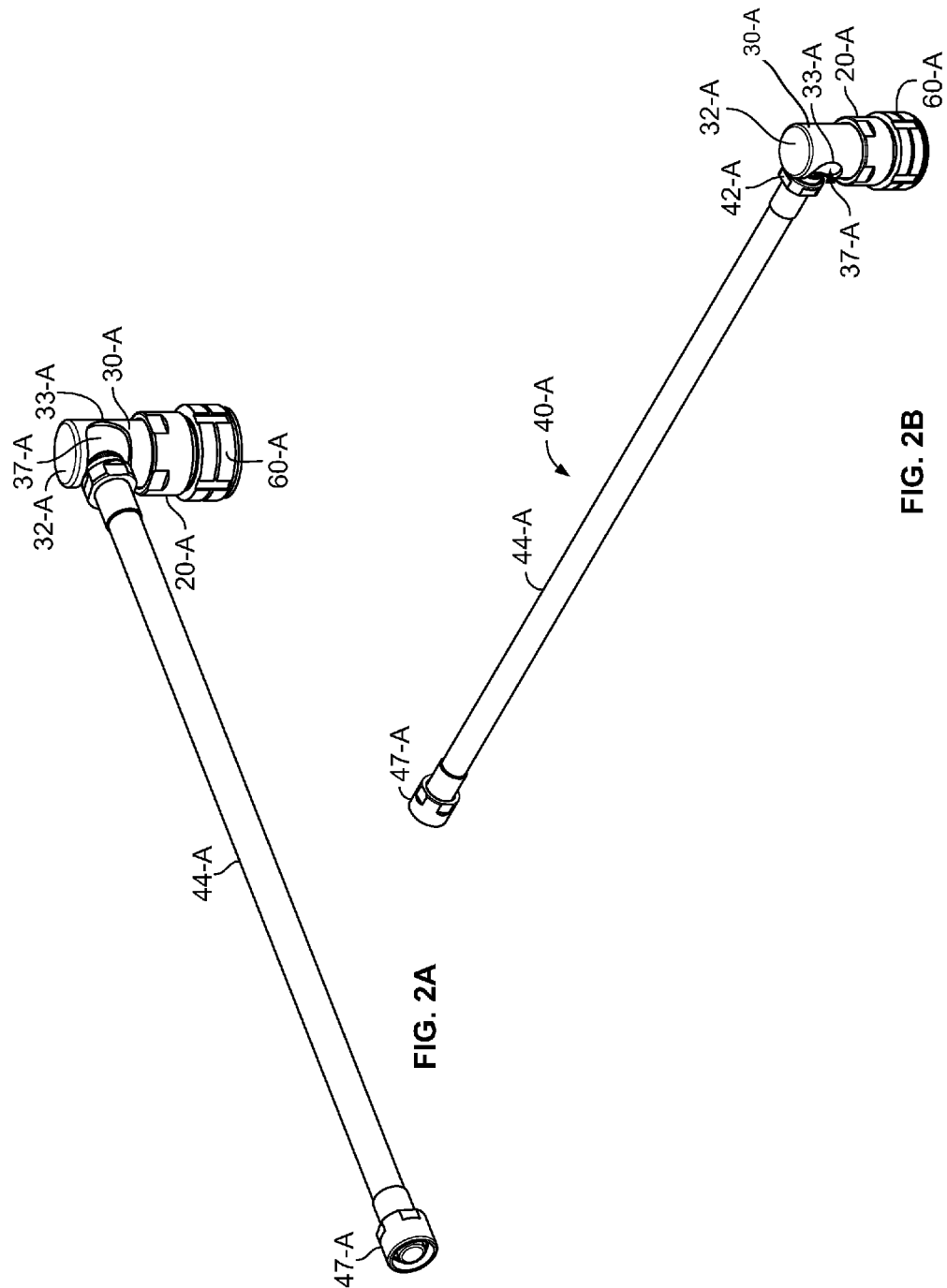

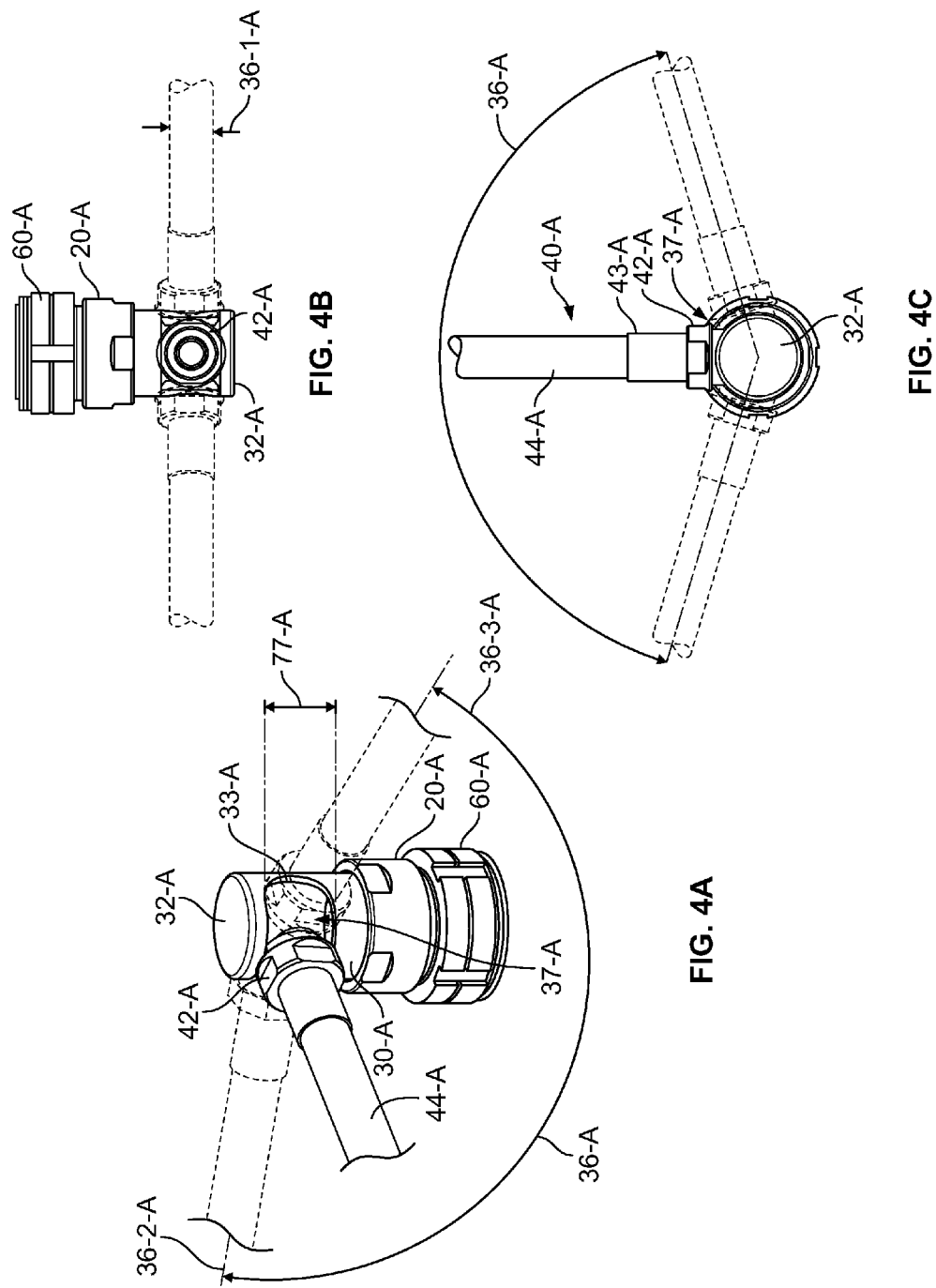

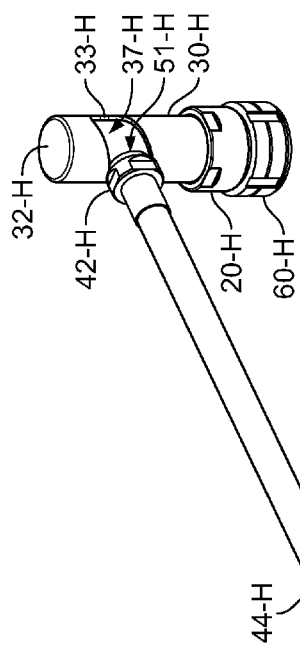
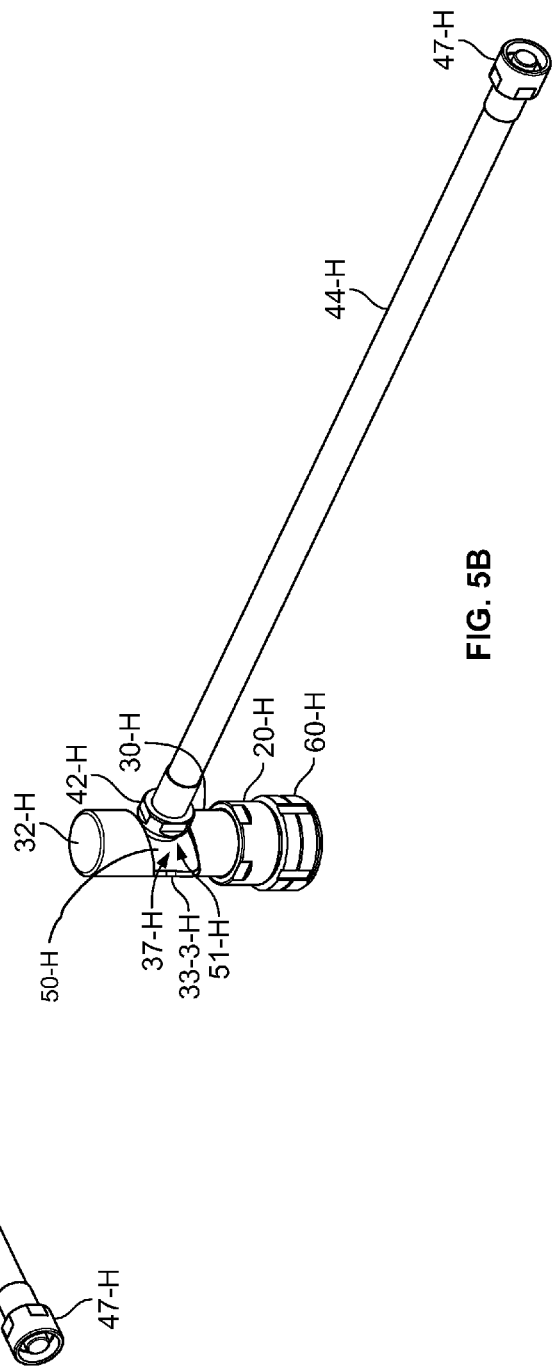
FIG. 5A
FIG. 5B

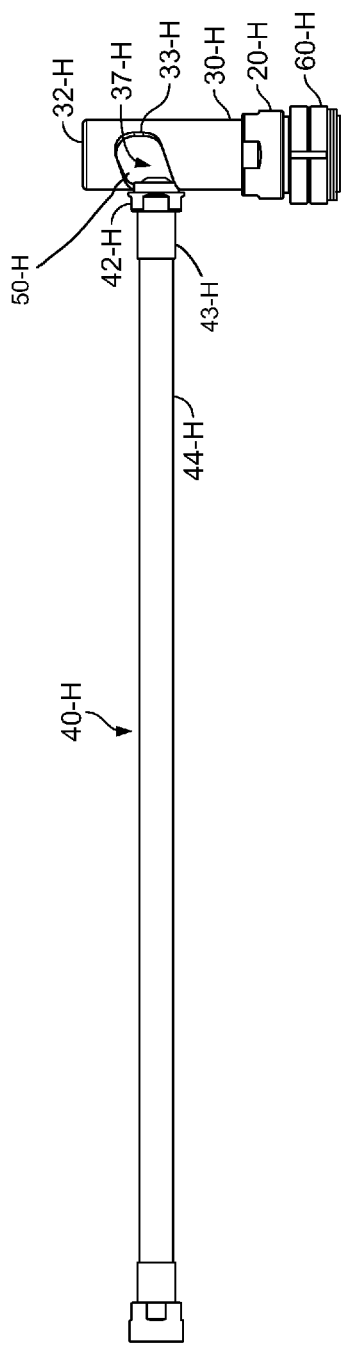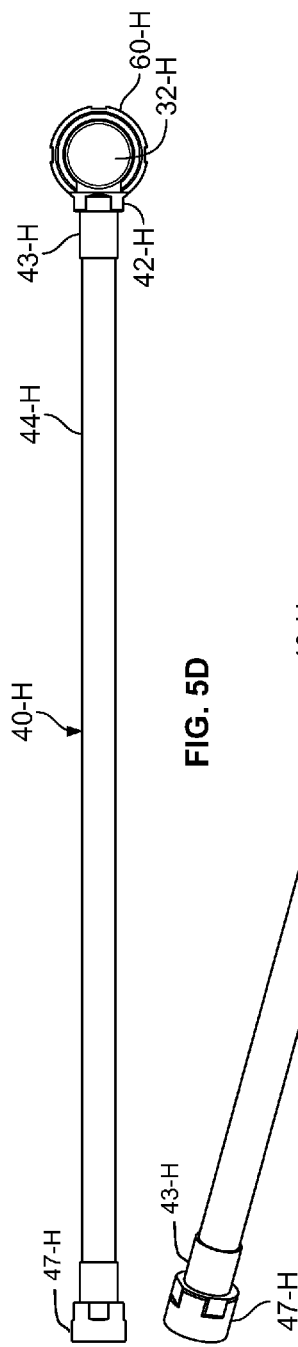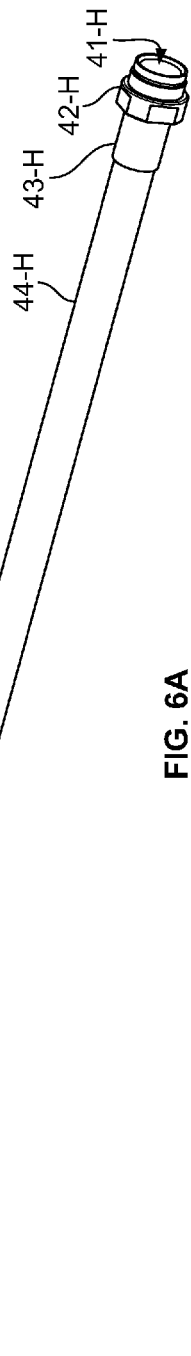
FIG. 5C
FIG. 5D
FIG. 6A

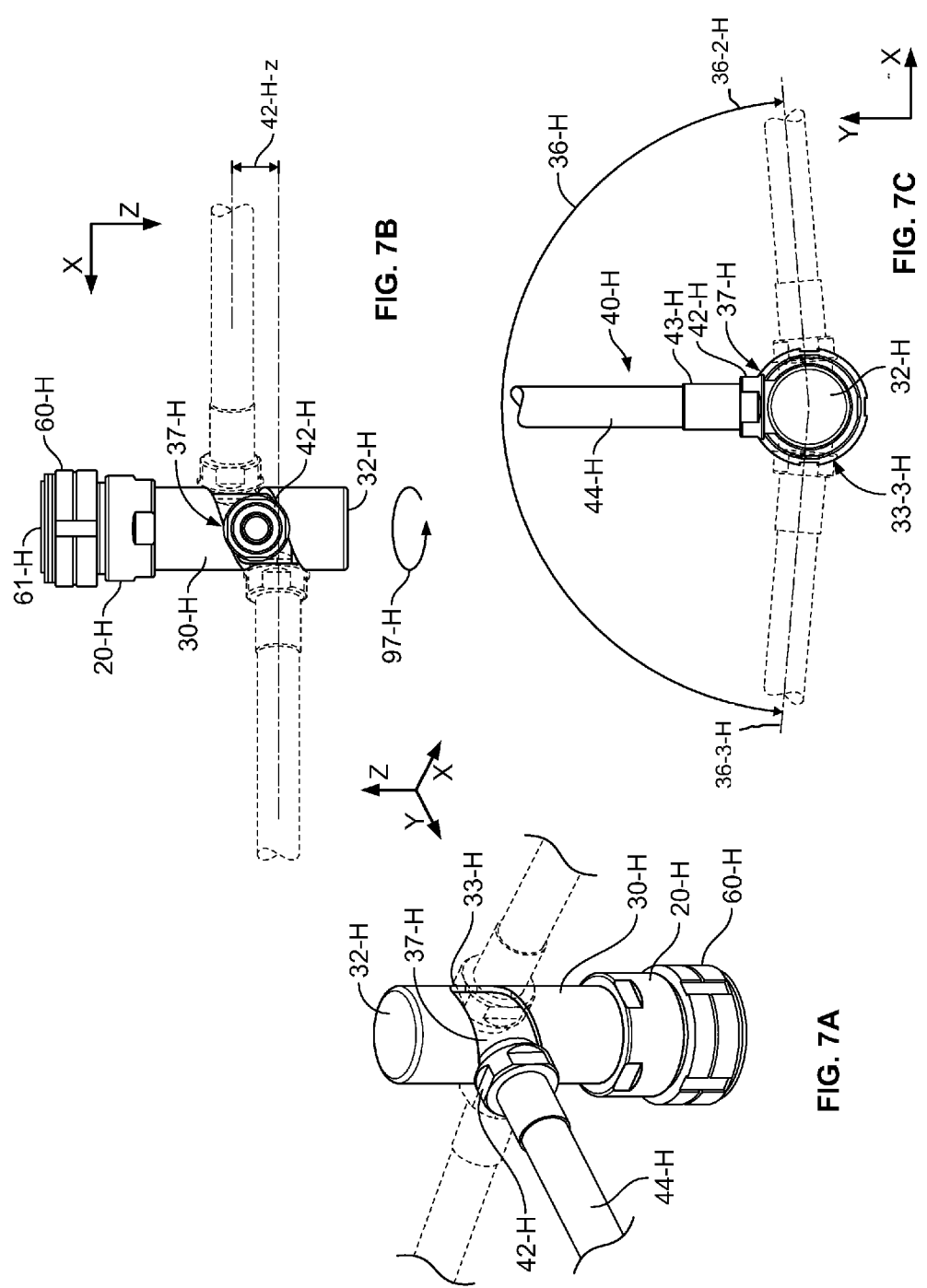

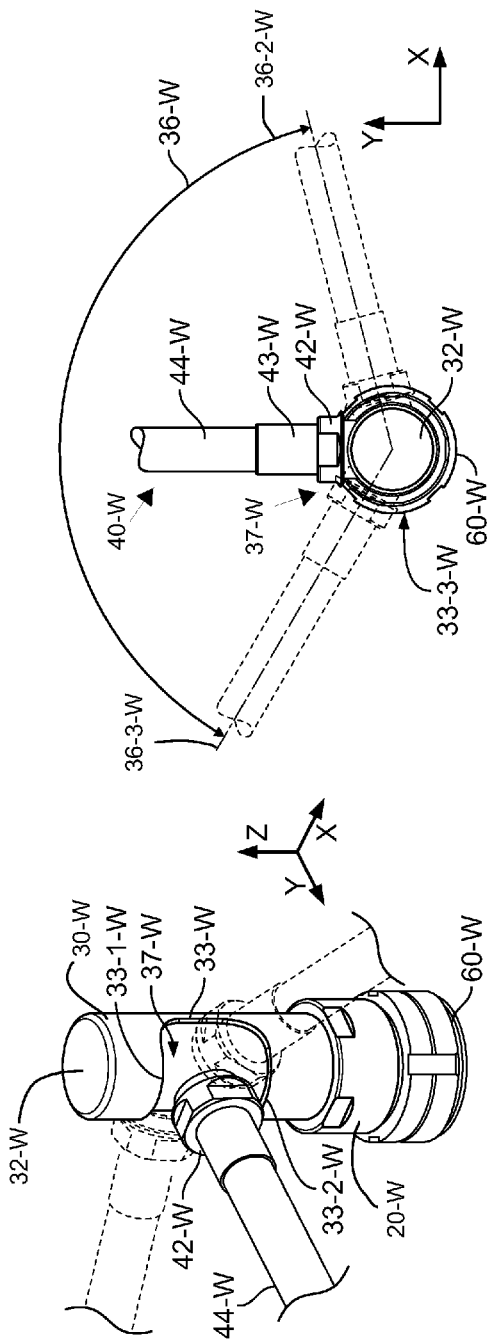
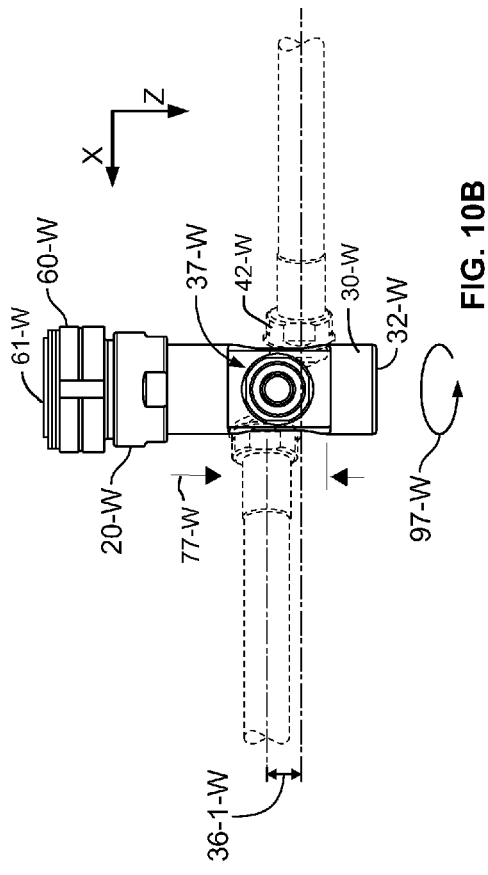
FIG. 10A
FIG. 10B
FIG. 10C

ROTATABLE WIRING HARNESS FOR CABLE AND METHOD

CROSS REFERENCE TO RELATED APPLICATIONS

This application claims priority to U.S. Provisional Application No. 61/863,598, filed 8 Aug. 2013, the entire contents of which are incorporated herein by reference.

FIELD OF THE INVENTION

The present invention relates to a wiring harness device and method thereof, and more particularly to a rotatable wiring harness and method thereof.

BACKGROUND OF THE INVENTION

The present invention relates generally to a wiring harness for cabling. More particularly, the present invention relates to a rotatable wiring harness with respect to a fixed connector.

Transferring signals via cables or wires remains a preferred and a reliable mode for many applications, despite the advent of wireless means for transferring signals. Generally, cables are made of electrically conducting materials such as copper, aluminum, etc. and are shielded by an insulating material such as rubber or plastic for protection and safe handling. In some applications both an interfacing connector and a test point connector are flexibly tethered. In other field conditions the test point connector may be in a fixed position. In still other field applications the test point connector may be in a fixed position and in a fixed location, wherein the path for the interfacing connector and cable is congested. The test point location may change or the access path to the same may change. The pathway for the cable, any cable conduit, and the interfacing connector may include obstacles. A same testing interfacing connector may need to gain electrical connection, mating, to different test point connectors, each affording only limited pathways for the connecting cable. Conventionally, different cable to connector orientations are provided by different fixed cable to electrical connector assemblies, shown for example, in FIGS. 1A and 1B.

Cables that are used in high-end sophisticated systems such as satellite electronic harness systems or aircraft systems may be desired to have, and may be required to have, capability to be environmentally sealed or to withstand electromagnetic interference. This requirement may be for on craft system harnesses as well as testing harnesses.

While, flexible cabling may be able to conform to the walls of a structure or to avoid obstacles, flexible cables may not be compatible with the subject test point connector. Conventionally, flat cables may be flexible and able to bend. One desirable feature of the flexible cable and testing connector assembly is the manipulations that can be made to the cable in real time, repositioning the cable to fit within the available pathway to the test point connector. As an example, the desired test point connector to which mating of an interface connector is desired may be an avionics system's test point connector on board an aircraft. Such real time adjustments may be desirable due to a change in the open pathway over time or due to the use of the cable and testing connector with different test point connectors and different respective fixed pathways.

Not only the physical pathway but electromagnetic interference generated by aircraft or weapons configurations may also vary across aircraft or within a given aircraft across different plans for use. In addition, in some field application cables may be subjected to high heat conditions.

SUMMARY OF THE INVENTION

The present invention provides a cable harness that affords real time adjustment of the connecting cable orientation to an interfacing connector. The adjustment is multi-functional and may replace the need for multiple cables for testing of a given aircraft or for testing of multiple aircraft. Further, the cable harness can provide environmental and electromagnetic interference shielding. Embodiments of the present invention may have any of the aspects below.

One aspect of the present invention is its capability of re-positioning its connecting cable relative to its interface connector.

Another aspect of the present invention is its application in obstructed pathways.

Another aspect of the present invention is its application in connection cabling pathways that change from one test period to another test period for a given fixed testing point connector.

Another aspect of the present invention is the adjustability of the relative orientation between the connecting cable and its interface connector in real time, during field application.

Another aspect of the present invention is that it accommodates varying access angles.

Yet another aspect of the present invention that it can be adjusted vertically as well as rotationally.

Yet another aspect of the present invention is that it may provide environmental shielding.

Still another aspect of the present invention is that it may provide electromagnetic interference shielding.

A test kit comprising a cable in accordance with an exemplary embodiment of the present invention may require fewer test cables, lessening the cost and weight of the test kit.

Still another aspect of the present invention is that it is readily adjusted to accommodate different physical pathways across different aircraft or across a same aircraft.

Yet another aspect of the present invention is that the integrity of the cabling is preserved throughout repeated adjustments.

Another aspect of the present invention may be reduced time and labor for electrical testing afforded by the harness adjustability during field applications, or otherwise desired, reconfigurations.

Another aspect of the present invention is adjustability in a helical path of the connecting cable to the interface connector.

Another aspect of the present invention is adjustability in a direction perpendicular to the face of the interfacing connector.

BRIEF DESCRIPTION OF THE FIGURES

The detailed description is presented with reference to the accompanying figures. Like numbers across drawings may reference like features and components, but may vary across embodiments. For more complete understanding of the features and advantages of the present invention, reference is now made to the detailed description of the invention along with the accompanying figures, wherein:

FIG. 2A illustrates a left front perspective view of a wiring harness, in accordance with an exemplary rotational adapter embodiment of the present invention;

FIG. 2B illustrates a right back perspective view of a wiring harness, in accordance with an exemplary rotational adapter embodiment of the present invention;

FIG. 4A illustrates a left front perspective rotational view of a wiring harness, in accordance with an exemplary rotational adapter embodiment of the present invention;

FIG. 4B illustrates an inverted front rotational view of a wiring harness, in accordance with an exemplary rotational adapter embodiment of the present invention;

FIG. 4C illustrates a top rotational view of a wiring harness, in accordance with an exemplary rotational adapter embodiment of the present invention;

FIG. 5A illustrates a left front perspective view of a wiring harness, in accordance with an exemplary helical embodiment of the present invention;

FIG. 5B illustrates a right front perspective view of a wiring harness, in accordance with an exemplary helical embodiment of the present invention;

FIG. 5C illustrates a side view of a wiring harness, in accordance with an exemplary helical embodiment of the present invention;

FIG. 5D illustrates a top view of a wiring harness, in accordance with an exemplary helical embodiment of the present invention;

FIG. 6A illustrates a right front perspective view of a conduit with conduit connector in accordance with an exemplary helical embodiment of the present invention;

FIG. 7A illustrates a left front perspective rotational view of a wiring harness, in accordance with an exemplary helical embodiment of the present invention;

FIG. 7B illustrates an inverted front rotational view of a wiring harness, in accordance with an exemplary helical embodiment of the present invention;

FIG. 7C illustrates a top rotational view of a wiring harness, in accordance with an exemplary helical embodiment of the present invention;

FIG. 10A illustrates a left front perspective rotational view of a wiring harness, in accordance with an exemplary window height embodiment of the present invention;

FIG. 10B illustrates an inverted front rotational view of a wiring harness, in accordance with an exemplary window height embodiment of the present invention;

FIG. 10C illustrates a top rotational view of a wiring harness, in accordance with an exemplary window height embodiment of the present invention;

DETAILED DESCRIPTION OF THE INVENTION

The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are merely illustrative of ways to make and use the invention, and do not limit the scope of the invention.

Figure 1B:
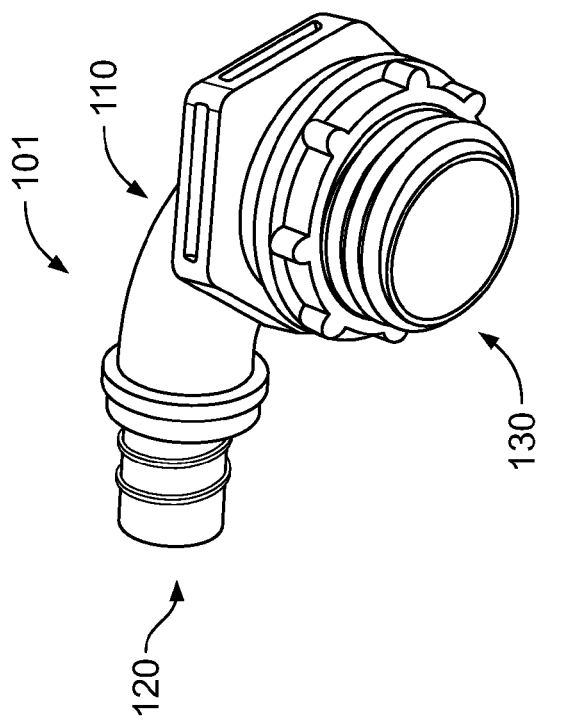
FIGS. 1A-1B illustrate a conventional wiring conduit that affords a fixed ninety degree cable to interface connector orientation.
Figure 1A:
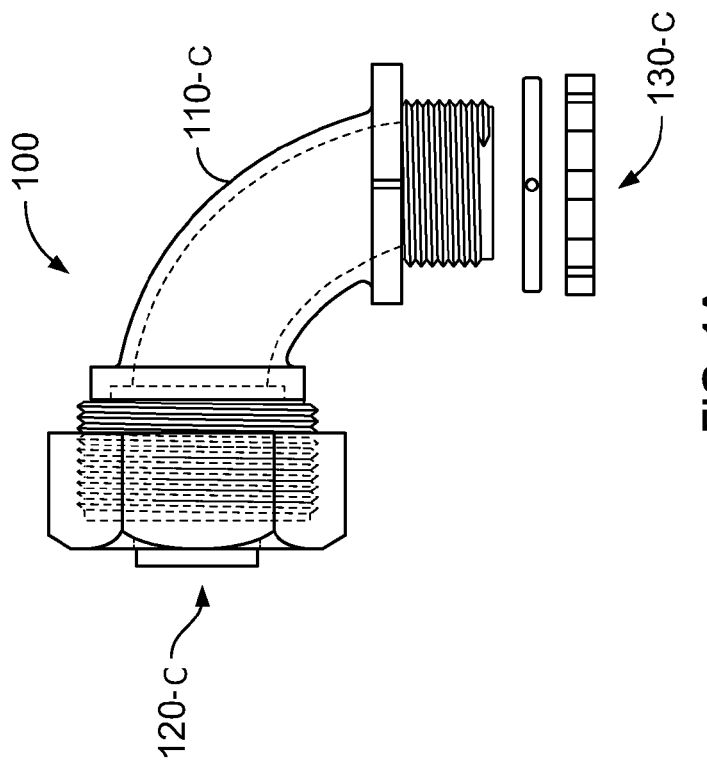

FIGS. 1A-1B illustrate a conventional wiring conduit that affords a fixed ninety degree cable to interface connector orientation. The wiring conduit 100 in FIG. 1A has an interfacing connector end 130-C, a fixed ninety degree bend 110-C, and a cable exit end 120-C. Similarly, the wiring conduit 101 in FIG. 1B has an interfacing connector end 130, a fixed ninety degree bend 110, and a cable exit end 120. In contrast embodiments of the present invention afford a rotatable angle between the interfacing connector and the exiting cable conduit. FIG. 2A illustrates a left front perspective view of a wiring harness, in accordance with an exemplary rotational adapter embodiment of the present invention. Referring to the foreground, a cable exit end 47-A connects to a conduit 44-A. The conduit extends into a backshell slot 37-A. The top 32-A of the backshell 30-A is above slot 37-A and a front edge 33A of slot 37-A is also shown. Beneath the slot 37-A is a coupling nut 20-A. And still below the coupling nut 20-A, an electrical interfacing connector 60-A is shown. The type of interfacing electrical connector may vary across embodiments of the present invention as required or desired for a given application. Connector types in accordance with rotational adapter embodiments of the present invention include, but are not limited to, series III plug connectors. In accordance with another exemplary embodiment, the cable exit end 47-A houses a cable which extends to a testing equipment connector, not shown.

FIG. 2B illustrates a right front perspective view of the wiring harness shown in FIG. 2A, in accordance with an exemplary rotational adapter embodiment of the present invention. The coupling nut 20-A is now in the foreground and secures electrical interfacing connector 60-A, below, to the backshell 30-A, above. A front edge 33-A of a backshell slot 37-A is shown beneath a top wall 32-A of the backshell and above the coupling nut 20-A. The conduit 44-A of the conduit assembly 40-A is shown extending from its conduit connector 42-A to its exit end 47-A. In accordance with an exemplary embodiment, the conduit itself may be made of a combination of rubber, plastic, and stainless steel.

Figure 2C:
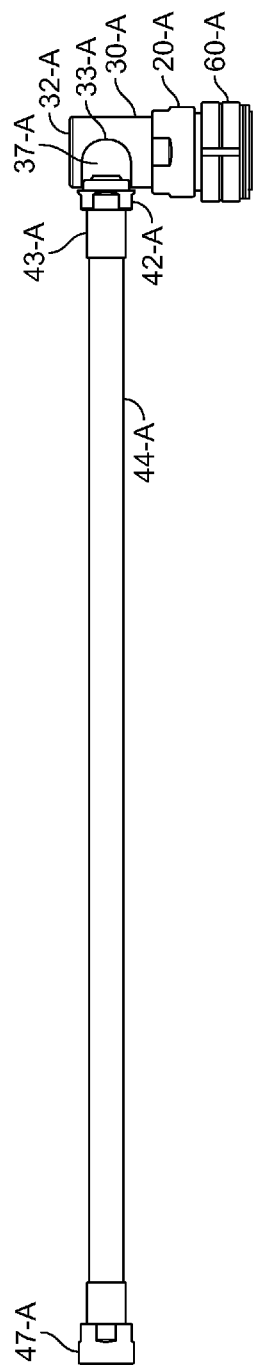
FIG. 2C illustrates a side view of a wiring harness, in accordance with an exemplary rotational adapter embodiment of the present invention.

FIG. 2C illustrates a side view of a wiring harness, in accordance with an exemplary rotational adapter embodiment of the present invention. From the left, exit end 47-A of the cable conduit connects to the conduit 44-A which extends into an outer fitting 43-A, which connects to a threaded conduit connector 42-A, threads not shown. Conduit connector 42-A is shown fitted through the backshell slot 37-A. A front edge 33-A of the backshell slot 37-A is spaced from the conduit connector 42-A in the side view. The coupling nut 20-A secures a bottom end of a backshell 30-A to the electrical interfacing connector 60-A. In accordance with the exemplary embodiment shown in FIG. 2C, the top 32-A of the backshell 30-A is relatively close to a top edge of a slot 37-A, affording a low profile for the rotatable adapter wiring harness. The mechanical connection between the backshell 30-A and the interface connector 60-A is provided by coupling nut 20-A.

Figure 2D:
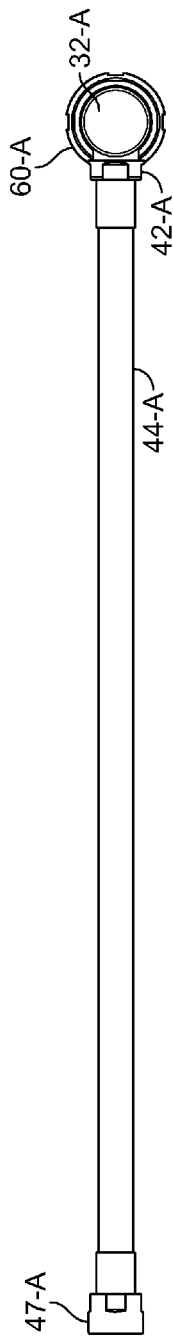
FIG. 2D illustrates a top view of a wiring harness, in accordance with an exemplary rotational adapter embodiment of the present invention.

FIG. 2D illustrates a top view of the wiring harness shown in FIGS. 2A-2C, in accordance with an exemplary rotational adapter embodiment of the present invention. The length of the conduit 44-A is shown with the exit end 47-A on the left and the conduit connector 42-A on the right. The conduit connector is shown passing through the slot 37-A to attach to the cylinder, not shown. The top 32-A of the backshell can be seen as well as an outer edge of the electrical interface connector 60-A.

Figure 3A:
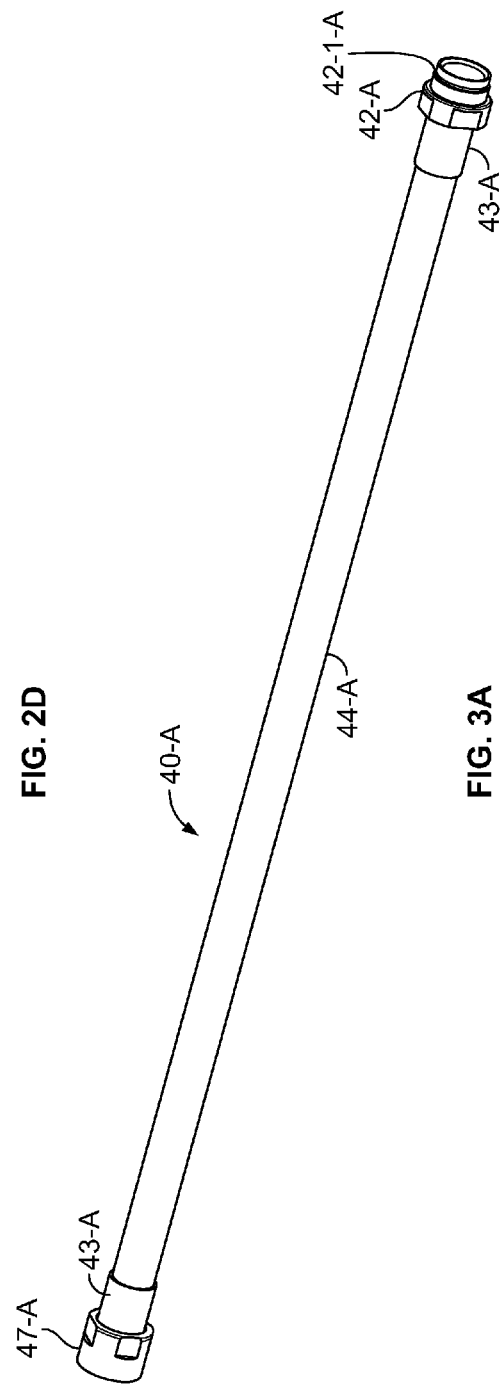
FIG. 3A illustrates a right front perspective view of a conduit with conduit connector in accordance with an exemplary rotational adapter embodiment of the present invention.

FIG. 3A illustrates a right front perspective view of a conduit assembly 40-A. Conduit 44-A has an exit end 47-A and a conduit connector 42-A on its opposite end. Flanking each end of conduit 44-A are outer fittings 43-A. In accordance with an exemplary embodiment of the present invention, conduit connector 42-A is threaded, threads not shown, at its insertion end; the threaded embodiment is described below with reference to FIG. 3E. A circumferential indent 42-1-A is shown at an insertion end of connector 42-A. In accordance with an exemplary embodiment, the conduit connector's 42-A external threads mate with internal threads in the cylinder, not shown; the indent 42-1-A versus threads are shown for drawing simplification. The referenced threading is particularly shown in FIG. 3E, and further described below with reference to the same.

Figure 3B:
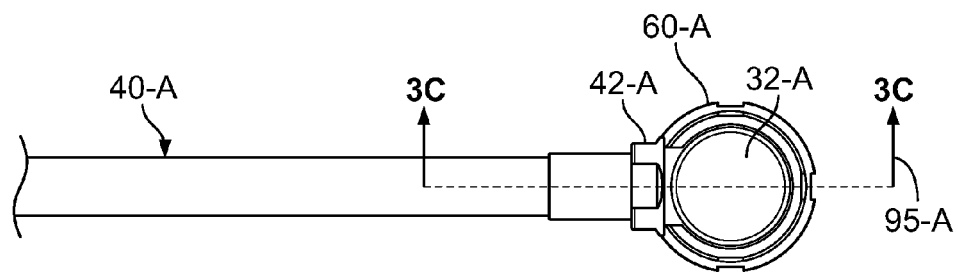
FIG. 3B illustrates a partial top view of a wiring harness showing cross sectional line 3C-3C, in accordance with an exemplary rotational adapter embodiment of the present invention.

FIG. 3B illustrates a partial view of the top view of FIG. 2D showing cross sectional line 3C-3C, in accordance with an exemplary rotational adapter embodiment of the present invention. The partial top view shows a portion of the conduit assembly 40-A with the conduit connector 42-A inserted into the backshell and cylinder assembly, where the cylinder is not shown but the top wall of the backshell 32-A and the outer edge of the electrical interface connector 60-A are identified. A cross section is taken along line 3C-3C 95-A and the resulting cross sectional view is shown in FIG. 3C.

Figure 3C:
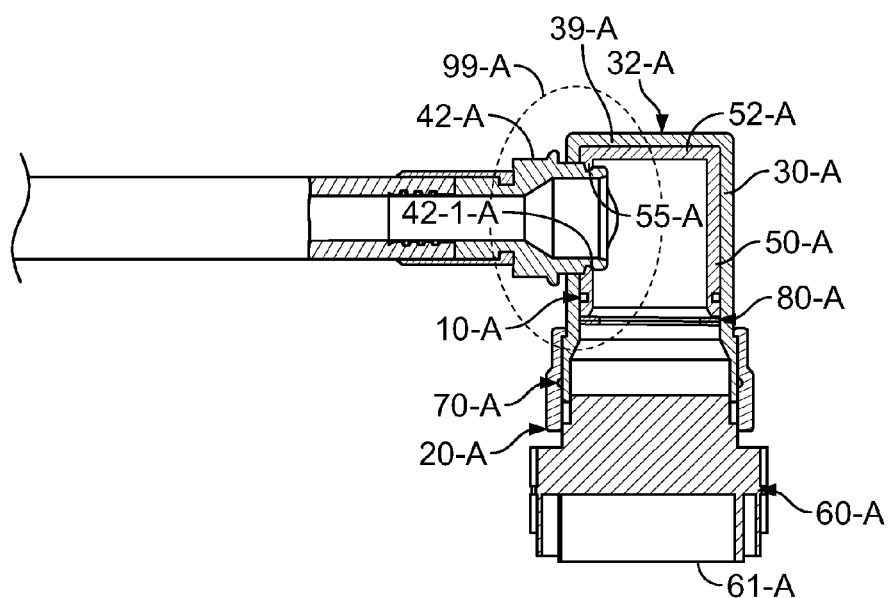
FIG. 3C illustrates a cross sectional view along line 3C-3C in FIG. 3B of a wiring harness, in accordance with an exemplary rotational adapter embodiment of the present invention.

FIG. 3C illustrates a cross sectional view along line 3C-3C in FIG. 3B of a wiring harness, in accordance with an exemplary rotational adapter embodiment of the present invention. An outer side of top side 52-A of the cylinder 50-A rests against an inside 39-A top wall 32-A of the backshell 30-A. Conduit connector 42-A is inserted into cylinder 50-A. An enlargement of a portion 99-A of FIG. 3C is shown in FIG. 3E. The indent 42-1-A of the connector is shown fitted into edge 55-A of the cylinder. In accordance with exemplary embodiments of the present invention, the mechanical coupling or method of securing the conduit connector 42-A to the cylinder 50-A may be the mating of threads, threads not shown. This threaded coupling is shown and more particularly described in and with reference to FIG. 3E, below. In alternate embodiments a different connector 42-A and receptacle in the cylinder 50-A may be used. O-ring 10-A provides a seal between an outer circumference of the cylinder 50-A and an inner circumference of the backshell 30-A. The coupling nut 20-A joins the interface connector 60-A to the backshell 30-A. Retaining ring 80-A secures the cylinder 50-A relative to the backshell 30-A in the vertical direction. The cylinder 50-A acts as a swivel bushing in accordance with embodiments of the present invention. O-ring 70-A provides a seal between the backshell 30-A and the coupling nut 20-A. The electrical contacts of the interfacing connector 60-A are not shown. In FIG. 3C, the connecting face 61-A of the electrical interfacing connector 60-A is identified. The interconnections between the conduit connector, backshell, and cylinder of portion 99-A are shown in greater detail in FIG. 3E.

Figure 3D:
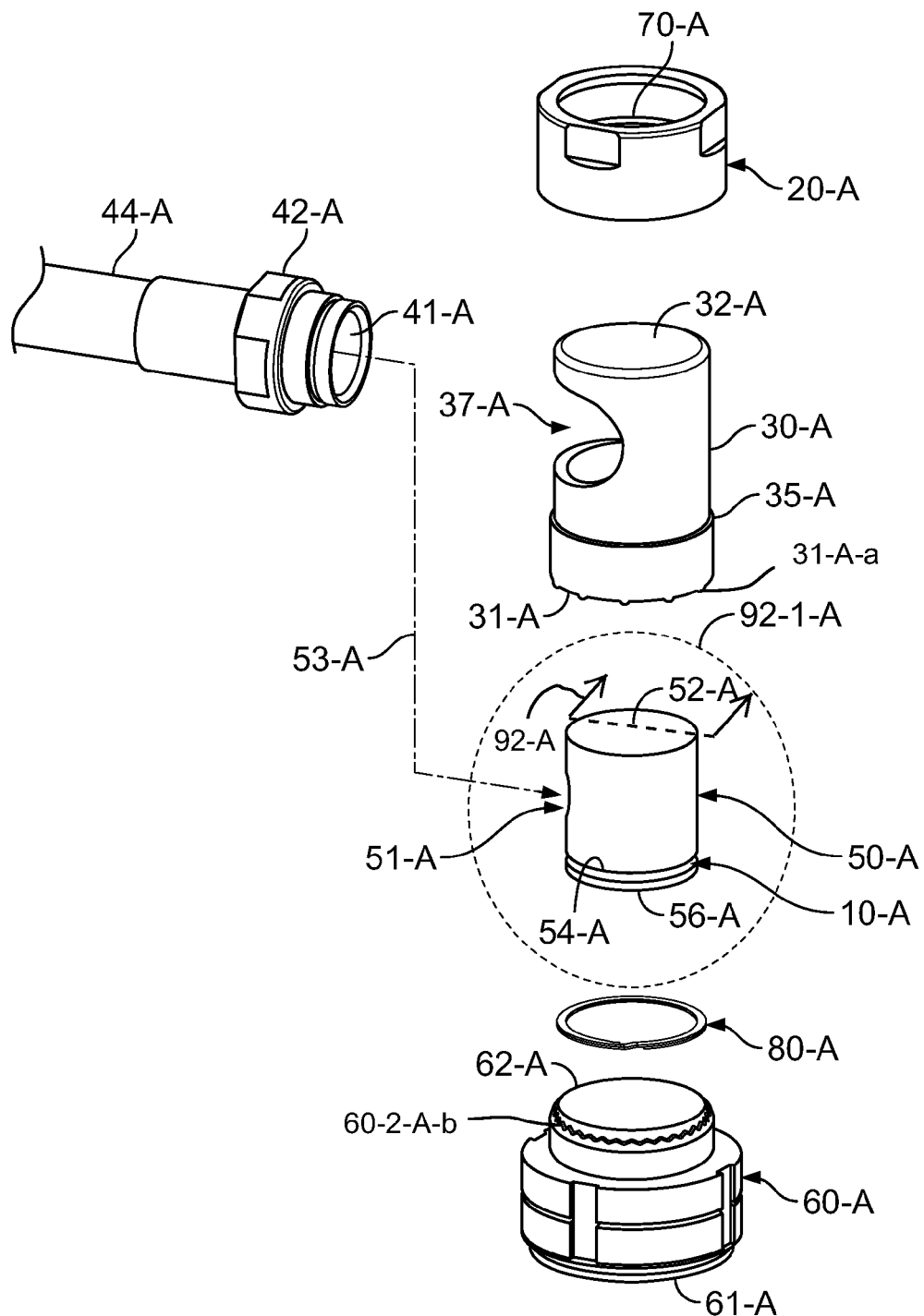
FIG. 3D shows an exploded view of a wiring harness, in accordance with an exemplary rotational adapter embodiment of the present invention.
Figure 3E:
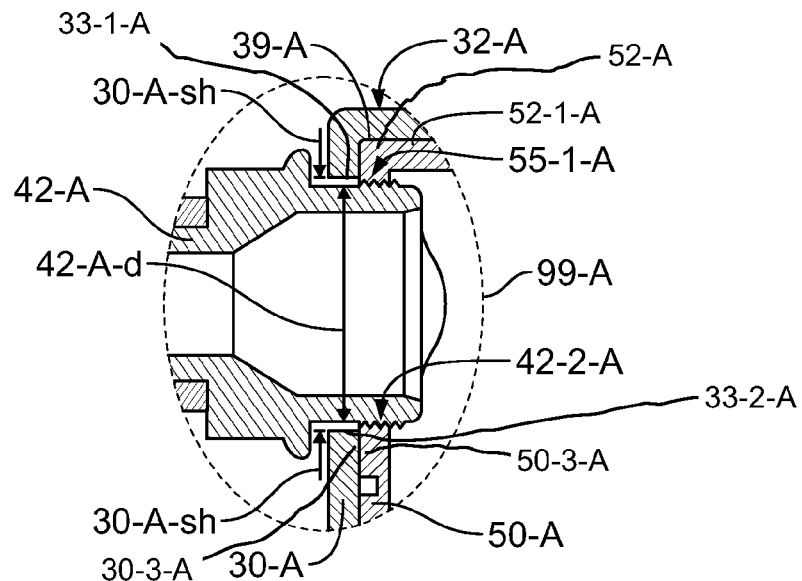
FIG. 3E shows a portion of FIG. 3C in greater detail, in accordance with a conduit connector to cylinder attachment in an exemplary embodiment of the present invention.

FIG. 3D shows an exploded view of a wiring harness, in accordance with an exemplary rotational adapter embodiment of the present invention. The attachment end 41-A of the conduit connector 42-A connects to cylinder 50-A at receptacle point 51-A, as indicated by line 53-A. Conductor conduit 44-A is shown connected to conduit connector 42-A. An outer surface of a top side 52-A of the cylinder 50-A is shown beneath a bottom edge 31-A of the backshell 30-A. Just above the bottom edge 31-A of the backshell 30-A is a lower edge 35-A of the backshell 30-A. The open slot 37-A of the backshell 30-A will align with the receptacle point 51-A of the cylinder 50-A when the wiring harness is assembled. The coupling nut 20-A is shown above an outer surface of a top side 32-A of backshell 30-A. In accordance with the exemplary rotatable adapter shown in FIG. 3D, an o-ring 70-A is seated inside the coupling nut 20-A.

Figure 3F:
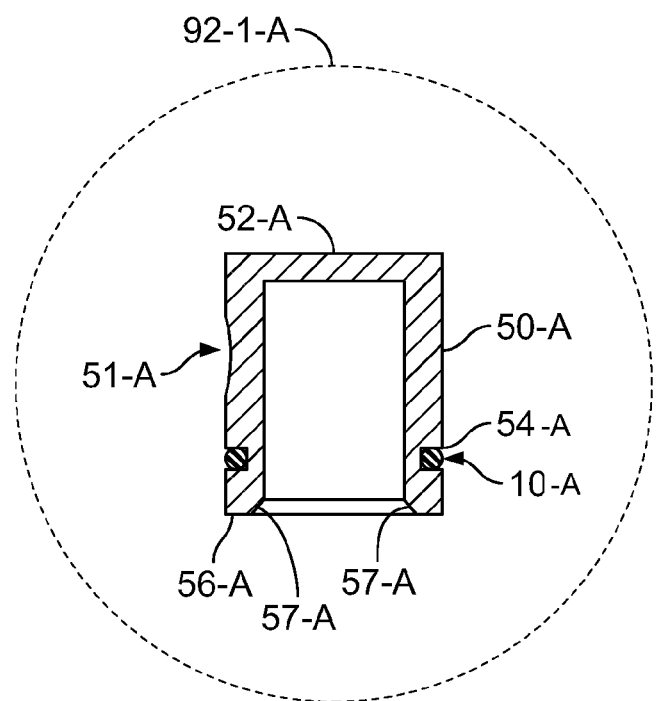
FIG. 3F shows greater detail of a rotational adapter cylinder a cross sectional view, in accordance with an exemplary embodiment of the present invention in greater detail.

Turning to the cylinder, 50-A, an o-ring 10-A seats between a lower edge 54-A and a bottom edge 56-A. A cross sectional view taken along line 92-A of the cylinder portion 92-1-A of FIG. 3D is shown in FIG. 3F. The cylinder and its bottom portion are shown in greater detail in FIG. 3F. A top side 52-A of the cylinder is shown beneath the bottom edge 31-A of backshell 30-A. The electrical connecting end, connecting face, 61-A of the electrical interfacing connector 60-A is shown beneath the retaining ring 80-A. The top 62-A of the electrical interface connector 60-A fits into the bottom 31-A of the backshell and is secured to the backshell by coupling nut 20-A. Also shown are anti-rotational teeth 31-A-a, which are further described below in reference to FIG. 17 and their position on the harness is discussed below relative to FIG. 9E. Anti-rotational teeth 31-A-a, along the bottom edge 31-A of the backshell 30-A mate with the anti-rotational teeth 60-2-A-b of the connector 60-A.

FIG. 3E shows portion 99-A of FIG. 3C in greater detail, in accordance with an exemplary rotational adapter embodiment of the present invention. The external threads 42-2-A of the conduit connector 42-A are mated with internal threads 55-1-A of the cylinder 50-A. The slot height 30-A-sh is just slightly larger than an external conduit connector diameter 42-A-d. An outside diameter 42-A-d of the conduit connector 42-A extends to a close proximity to an inside of bottom 33-2-A edge and a top 33-1-A edge of the slot 37-A in the backshell 30-A. In accordance with an exemplary embodiment the slot height can limit the vertical displacement of the conduit connector from the electrical connector. Also shown in this enlarged view is the juxtaposition of the outer side 52-1-A of the top side 52-A of the cylinder 50-A to the inside surface 39-A of a top wall 32-A of the backshell 30-A. Similarly, the outer surface of the cylinder 50-A side wall 50-3-A mates up against the inner surface of a side wall 30-3-A of the backshell 30-A. In alternate embodiments of the present invention, the outside surface of the top of the cylinder may be separated from the inside of the top wall of the backshell during operation of the wiring harness. In still other embodiments the cylinder and backshell may be configured such that the top surfaces of the cylinder and backshell, respectively, do not make contact regardless of the operational status of the wiring harness.

FIG. 3F shows a cross sectional view of a rotational adapter cylinder, 92-1-A in FIG. 3D, in greater detail, in accordance with an exemplary embodiment of the present invention. The cross sectional reference view line 92-A is shown in FIG. 3D. Referring again to FIG. 3F, the cylinder has a closed top side, top wall, 52-A and an open bottom edge 56-A. Between lower edge 54-A and bottom edge 56-A is a channel into which an o-ring 10-A may be housed. The inside of bottom edge of 56-A of the cylinder 50-A is chamfered 57-A. The insertion point or receptacle 51-A for the conduit connector is shown.

FIG. 4A illustrates a rotational view in a left front perspective of a wiring harness, in accordance with an exemplary rotational adapter embodiment of the present invention. The conductor conduit 44-A is in the foreground midway in the rotational range 36-A. The conduit connector 42-A fits through slot 37-A of the backshell 30-A. The conduit connector 42-A is shown in the middle range of the slot 37-A, where a front edge 33-A provides a rotational stop for a counter clockwise 36-3-A direction. Similarly a back edge, not shown, of slot 37-A provides a stop for maximum clockwise rotation position 36-2-A. In accordance with the exemplary embodiment of FIGS. 4A-4C and FIG. 3C, the diameter of the insertion portion of the conduit connector 42-A nearly spans the vertical 77-A open distance of the slot 37-A. Also shown in this subject embodiment is the relatively low profile of the wiring harness; for example, a top side 32-A of the backshell 30-A is relatively close to a top edge of the slot 37-A. Coupling nut 20-A is shown below the backshell 30-A and secures the same to the interface connector 60-A. The embodiment of FIGS. 4A-4C affords a rotation span 36-A near 130 degrees.

FIG. 4B illustrates an inverted front rotational view of a wiring harness, in accordance with an exemplary rotational adapter embodiment of the present invention. A top side 32-A of the backshell 30-A is now shown below conduit connector 42-A. In accordance with an exemplary embodiment of the present invention the cable conduit has a diameter 36-1-A of 0.69 inches. Coupling nut 20-A is shown, here, above the backshell 30-A and secures the backshell 30-A to the interface connector 60-A.

FIG. 4C illustrates a top rotational view of a wiring harness, in accordance with an exemplary rotational adapter embodiment of the present invention. A top surface 32-A of the backshell is shown above conduit connector 42-A. A rotation span 36-A of about 130 degrees is provided by the subject exemplary embodiment. The rotational span of any embodiments of the present invention can range from a minute rotation of single digit degrees to an angle of greater than 180 degrees. Conduit connector 42-A is shown inserted through slot 37-A of the backshell. The entire conduit assembly 40-A swings through the rotation angle about the cylinder, which acts as a swivel bushing. Conduit 44-A fits into outer fitting 43-A which is secured to an end conduit connector 42-A.

FIG. 5A illustrates a left front perspective view of a wiring harness, in accordance with an exemplary helical embodiment of the present invention. From the top of the figure, the top 32-H of the backshell 30-H is above slot 37-H and a front edge 33-H of the slot is also shown. From the foreground, a cable exit end 47-H connects to a conduit 44-H which connects to conduit connector 42-H, which extends through the backshell slot 37-H and into the cylinder at the receptacle point 51-H. In accordance with an exemplary embodiment the conduit connector 42-H mates with the receptacle point 51-H by mating external threads on connector 42-H and tapped threads at the receptacle 51-H. Beneath the slot 37-H at the lower end of the backshell 30-H is coupling nut 20-H, which couples the backshell to the electrical interfacing connector 60-H. The type of electrical interface connector may vary across embodiments of the present invention as required or desired for a given application. Connector types in accordance with helical embodiments of the present invention include, but are not limited to, MIL-DTL-38999. In accordance with exemplary embodiments, the cable exit end 47-H houses a cable which extends out of the conduit to a testing equipment connector, not shown.

FIG. 5B illustrates a right front perspective view of a wiring harness, in accordance with an exemplary helical embodiment of the present invention. The coupling nut 20-H is in the background and secures electrical interfacing connector 60-H, below, to the backshell 30-H, above. A back edge 33-3-H of the helical backshell slot 37-H is shown left of conduit connector 42-H. Conduit connector 42-H fits through the backshell slot 37-H and affixes into receptacle point 51-H of the cylinder 50-H, where the cylinder 50-H is housed within the backshell 30-H and is not shown. A top side 32-H of the backshell 30-H is also visible in this view. The conduit 44-H of the conduit assembly is shown extending from its conduit connector 42-H to its exit end 47-H.

FIG. 5C illustrates a side view of a wiring harness, in accordance with an exemplary helical embodiment of the present invention; From the left, exit end 47-H of the cable conduit connects to the conduit 44-H which extends into an outer fitting 43-H, which connects to a threaded conduit connector 42-H, threads not shown. Conduit connector 42-H is shown fitted into the backshell slot 37-H. A front edge 33-H of the backshell slot 37-H is spaced from the conduit connector 42-H in the side view. The coupling nut 20-H secures a bottom end of a backshell 30-H to the electrical interfacing connector 60-H. In accordance with the exemplary embodiment shown in FIG. 5C, the top 32-H of the backshell 30-H is relatively close to a top edge of a slot 37-H, but the harness has a higher profile than the rotatable adapter embodiment shown in FIGS. 2A-2C. The mechanical connection between the backshell 30-H and the interface connector 60-H is provided by coupling nut 20-H.

FIG. 5D illustrates a top view of a wiring harness, in accordance with an exemplary helical embodiment of the present invention. The length of the conduit 44-H is shown with the exit end 47-H on the left and the conduit connector 42-H on the right. The conduit connector is shown passing through the slot 37-H to attach to the cylinder 50-H, not shown in the top view 5D, shown in FIG. 5C. Referring again to FIG. 5D, the top 32-H of the backshell is shown; the outer edge of the electrical interface connector 60-H is also visible in this view. FIG. 6A illustrates a right front perspective view of a conduit assembly 40-H. Conduit 44-H has an exit end 47-H and a conduit connector 42-H on its opposite end with outer fitting 43-H at either end of conduit 44-H. The attachment end 41-H of the conduit connector 42-A connects to cylinder 50-A, not shown. Referring again to FIG. 6A, in accordance with an exemplary embodiment of the present invention 42-H is threaded at its insertion end, as described above with reference to FIG. 3E.

Figure 6B:
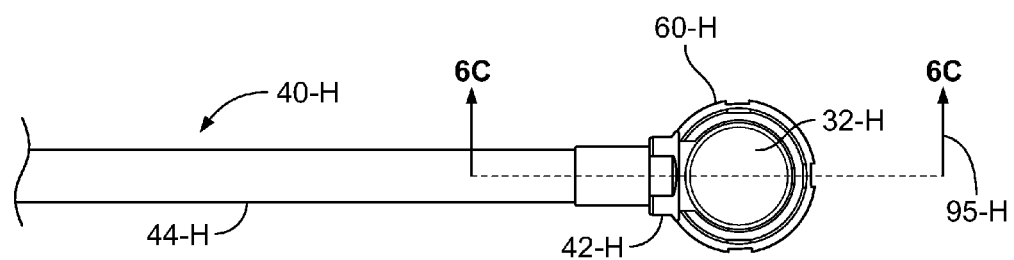
FIG. 6B illustrates a partial top view of a wiring harness showing cross sectional line 6C-6C, in accordance with an exemplary helical embodiment of the present invention.

FIG. 6B illustrates a partial view of the top view of FIG. 5D showing cross sectional line 6C-6C, in accordance with an exemplary helical embodiment of the present invention. The partial top view shows a portion of the conduit assembly 40-H with the cable conduit 44-H and with conduit connector 42-H inserted into the backshell and cylinder assembly, where the cylinder is not shown but the top of the backshell 32-H and the outer edge of the electrical interface connector 60-H are identified. A cross section is taken along line 6C-6C 95-H and the resulting cross sectional view is shown in FIG. 6C.

Figure 6C:
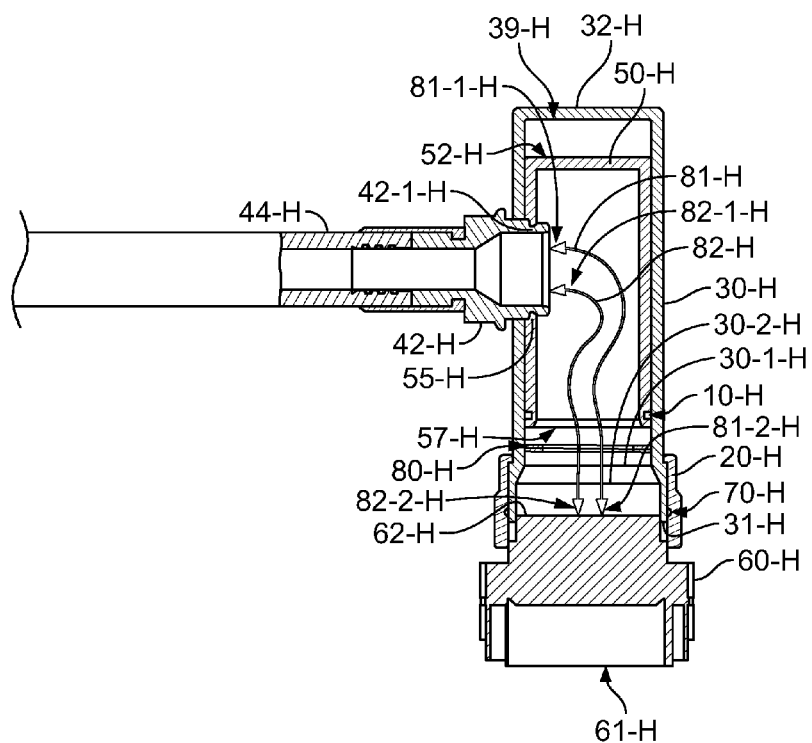
FIG. 6C illustrates a cross sectional view along line 6C-6C in FIG. 6B of a wiring harness, in accordance with an exemplary helical embodiment of the present invention.

FIG. 6C illustrates a cross sectional view along line 6C-6C in FIG. 6B of a wiring harness, in accordance with an exemplary helical embodiment of the present invention. An outside surface of a top 52-H of the cylinder 50-H is displaced from an inside surface 39-H of top wall 32-H of the backshell 30-H. Similar to the rotatable adapter, as shown in FIG. 3E and described above, the helical embodiment has a helical slot height near the diameter of the conduit connector, this height is constant along the helical slot path. Opposite the top 32-H of the backshell 30-H is the face 61-H of the interface connector 60-H.

The interfacing and securing mechanism between connector 42-H and cylinder 50-H are shown as an indent 42-1-H of the conduit connector 42-H, which fits into notch 55-H of cylinder 50-H. In accordance with exemplary embodiments of the present invention, the mechanical connection or method of securing the conduit connector 42-H to the cylinder 50-H is by the mating of threads, where such threads are shown in FIG. 3E and described above. O-ring 10-H provides a seal between an outer circumference of the cylinder 50-H and an inner circumference of the backshell 30-H. Coupling nut 20-H joins the interface connector 60-H to the backshell 30-H.

Retaining ring 80-H acts as stop for the cylinder 50-H, relative to the backshell 30-H, in the vertical direction. The cylinder 50-H acts as a swivel bushing in accordance with embodiments of the present invention. O-ring 70-H provides a seal between the backshell 30-H and the coupling nut 20-H. A chamfered 57-H bottom edge of the cylinder 50-H is displaced above retaining ring 80-H. The inner diameter of the backshell 30-H decreases from a first inner diameter 30-2-H from its electrical connector 60-H end to a second diameter 30-1-H just below the retaining ring 80-H. The top of the connector is where the section lines end on 60-H. The connector 60-H is shown fully inserted in the backshell 30-H. A bottom edge 31-H of the backshell is shown displaced from a ledge on the connector 60-H, described in further detail with reference to FIG. 9E, below. Referring again to FIG. 6C, also shown are anti-rotational teeth 31-H-a, which are further described below in reference to FIG. 17 and their position on the harness is discussed below relative to FIG. 9E. Anti-rotational teeth 31-H-a mate with the anti-rotational teeth 60-2-H-b of the connector 60-H.

A pair of slack wires 81-H and 82-H are shown extending into 81-2-H, 82-2-H from the top 62-H of the electrical connector 60-H and into 81-1-H, 82-1-H the conduit connector 42-H. The slack in the wires or cable affords the rotation or other displacement of the conduit 44-H relative to the connector 60-H with minimal strain on the cable wires, in accordance with exemplary embodiments of the present invention.

Figure 6D:
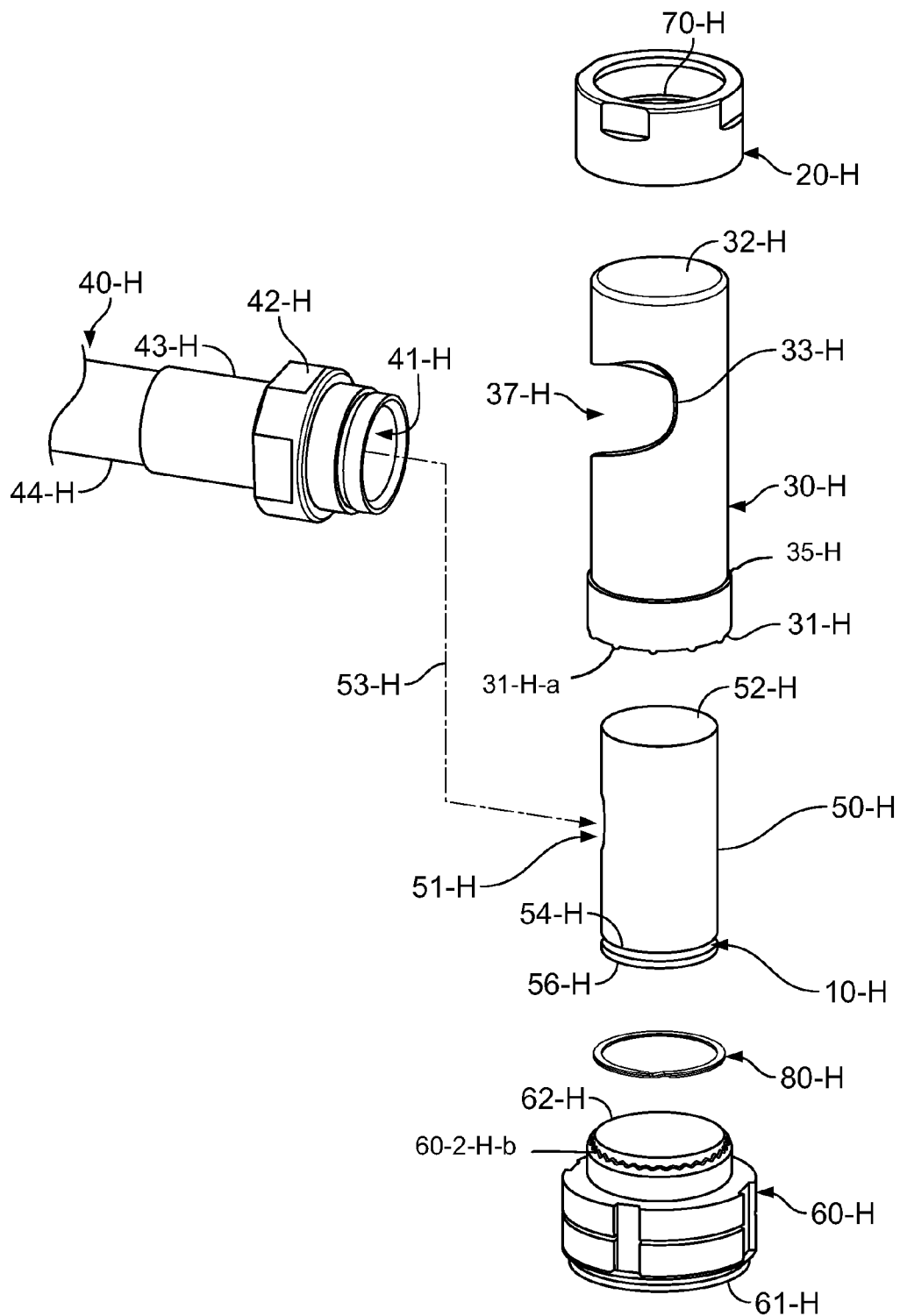
FIG. 6D shows an exploded view of a of a wiring harness, in accordance with an exemplary helical embodiment of the present invention.

FIG. 6D shows an exploded view of a wiring harness, in accordance with an exemplary helical embodiment of the present invention. The attachment end 41-H of the conduit connector 42-H connects to cylinder 50-H at receptacle point 51-H, as indicated by line 53-H. Conductor conduit 44-H is shown connected to conduit connector 42-H via outer fitting 43-H. Open slot 37-H of the backshell 30-H aligns with the receptacle point 51-H of the cylinder 50-H when the wiring harness is assembled. A front edge 33-H is visible. The backshell steps out to a larger outer diameter near a bottom edge 31-H forming a ledge 35-H.

An outer surface of a top side 52-H of the cylinder 50-H is shown beneath a bottom edge 31-H of the backshell 30-H. The coupling nut 20-H is shown above an outer surface of a top side 32-H of backshell 30-H. In accordance with the exemplary helical embodiment shown in FIG. 6D, an o-ring 70-H is seated inside the coupling nut 20-H. A channel between 54-H and 56-H is formed at the bottom of cylinder 50-H, where in accordance with the embodiment of FIG. 6D, an o-ring 10-H seats between 54-H and 56-H in the channel. This channel is more particularly shown in FIG. 3F. The electrical contact end 61-H of the electrical interfacing connector 60-H is shown beneath the retaining ring 80-H. The top 62-H of the interface connector 60-H fits into the bottom 31-H of the backshell and is secured to the backshell by coupling nut 20-H.

In accordance with the present invention, embodiments may enable repositioning of the conduit connector via rotation in the X-Y plane, where the face or electrical contact points of the interface connector are also in the X-Y plane, as in the rotational adapter described above and shown in FIGS. 2A-4C. In accordance with a rotational adapter embodiment, this repositioning can be made in real time during field applications and may even be performed when the interfacing connector is electrically connected to a test point connector.

In an alternate embodiment of the present invention, a helical repositioning of the conduit cable relative to the connecting face of the interface connector is enabled. The adjustability feature of the rotational adapter is augmented to include movement of the conductor conduit normal to the face of the interfacing connector, or in the Z direction. With respect to the helical embodiment, rotation is afforded through the X-Z and Y-Z planes, however rotation about the swiveling bushing remains in the X-Y plane and the cylinder translates in the Z direction. Similar to the slot in a rotational adapter embodiment, the helical embodiment has a constant height. In contrast to the planar slot of the rotational adapter, the helical slot harness moves in a helical form to enable simultaneous rotation in the X-Y plane and translation in the Z direction. In a helical embodiment the perpendicular distance of the conduit to the interfacing connector can be adjusted, increasing or decreasing as needed.

FIG. 7A illustrates a left front perspective rotational view of a wiring harness, in accordance with an exemplary helical embodiment of the present invention. The conduit adapter 42-H fits through slot 37-H of the backshell 30-H. The conduit connector 42-H is shown in the middle range of the slot 37-H, where a front edge 33-H provides a rotational stop for a counter clockwise 36-3-H direction. Similarly a back edge, not shown, of slot 37-H provides a stop for maximum clockwise rotation position 36-2-H. In accordance with the exemplary embodiment of FIGS. 4A-4C and FIG. 3C, the diameter of the insertion portion of the conduit connector 42-H nearly spans the vertical open distance, Z direction, of the slot 37-H. Also shown in the subject embodiment is a relatively low profile of the wiring harness; for example, a top wall 32-H of the backshell 30-H is relatively close to a top edge of the slot 37-H. Coupling nut 20-H is shown below the backshell 30-H and secures the same to the interface connector 60-H. Cable conduit 44-H extends into the foreground in this view.

FIG. 7B illustrates an inverted front rotational view of a wiring harness, in accordance with an exemplary helical embodiment of the present invention. A top wall 32-H of the backshell 30-H is now shown below conduit connector 42-H. In accordance with an exemplary embodiment of the present invention, the conduit connector can travel of 0.82 inches 42-H-z in the Z direction. Coupling nut 20-H is shown, here, above the backshell 30-H and secures the backshell 30-H to the interface connector 60-H.

FIG. 7C illustrates a top rotational view of a wiring harness, in accordance with an exemplary helical embodiment of the present invention. A top surface 32-H of the backshell is shown above conduit connector 42-H. A rotation span 36-H of about 130 degrees is provided by the subject exemplary embodiment. The rotational span of any embodiments of the present invention can range from a minute rotation of single digit degrees to an angle of greater than 180 degrees. Conduit connector 42-H is shown inserted through slot 37-H of the backshell. The entire conduit assembly 40-H swings through the rotation angle upon swiveling of the wiring harness. Conduit 44-H fits into outer fitting 43-H which is secured to an end conduit connector 42-H.

In accordance with the embodiment of FIGS. 7A-7C, if the conduit connector 42-H is in the front portion of the slot, towards front edge 33-H, it is farther away in the Z direction from the face 61-H of the interface connector 60-H. If conduit connector 42-H is against a back edge 33-3-H of the helical slot, then the conduit connector 42-H is closer in the Z direction to the face of the interface connector. In the embodiment of FIGS. 7A-7C the conduit moves away from the interface connector with a counter clockwise rotation 97-H. In alternate embodiments, the helical slot may increase the distance of the conduit from the interface connector with a clockwise rotation. The helical shaped slot allows the cable to avoid obstructions side to side as well as front to rear, relative to the interfacing connector.

In helical embodiments of the present invention and in rotational adapter embodiments of the present invention, the front edge and the back edge of the respective slots can provide positive lateral stops for the swivel. In accordance with embodiments of the present invention, a positive stop from the inside surface of the top wall of the backshell contacting an outer side of a top side of a cylinder may be employed in the positive Z direction away from the interface connector. In alternate embodiments, a top edge and a bottom edge of the slot itself may also provide the positive stops for movement in the Z direction. A stop in the negative Z direction can be provided by a retaining ring, such as 80-H in FIG. 6D or an additional retaining ring for the purpose of limiting vertical displacement can be employed.

In accordance with an exemplary embodiment, when the conduit fitting is moving through the helical slot toward the rear of the backshell, the rear end of the cylinder will make contact against the inside rear end of the backshell and stop. When the conduit fitting is moving forward through the helical slot the front end of the cylinder will make contact, for example against a snap ring or some other device that creates a reduction in the inside diameter of the backshell for the cylinder to stop against. Stopping against the inside of the backshell provides more surface area contact than the ends of the slot and therefore would create less wear when swiveling the backshell or conduit. Conventional swivel joints for cable harnesses may utilize bent tubing to make a 90 degree turn, as shown for example in FIGS. 1A and 1B. This conventional device can limit the sharpness of the turn that can be achieved. In turn, the length of the backshell is affected by the fixed elbow. The present invention provides a swivel joint with a relatively shallow Z directional clearance from the interface connector. This feature may be desirable in multiple applications, to include testing of aircraft systems.

A rotatable adapter wiring harness embodiment of the present invention permits rotation of the cable leg on a cable harness to swivel to any degree of rotation that is within the limits of the slot in the backshell. Positive stops prevent the cable from being over rotated. This rotation restriction may reduce wear and prevent damage to the electrical wires housed within the rotatable adapter wiring harness assembly. In accordance with an exemplary embodiment, a front edge of a backshell slot provides a forward or clockwise rotation stop and a back edge of the backshell slot provides a backward or counter-clockwise rotation stop. The length, distance from front edge to back edge, of the slot in the backshell can be made specific to a given field condition and a given apparatus to be tested.

Figure 8A:
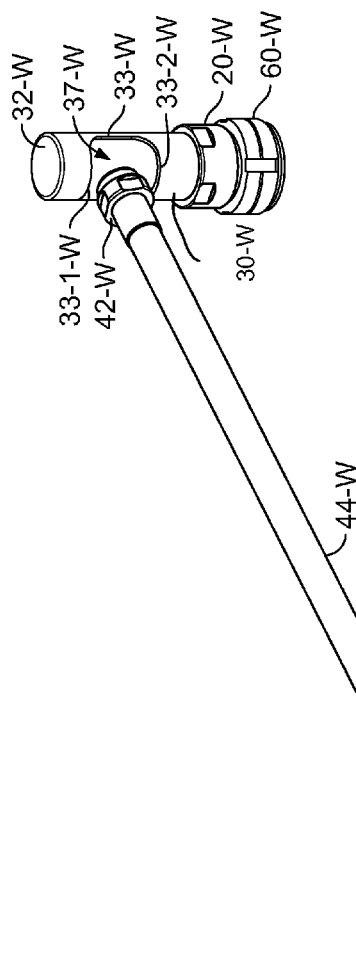
FIG. 8A illustrates a left front perspective view of a wiring harness, in accordance with an exemplary window height embodiment of the present invention.

FIG. 8A illustrates a left front perspective view of a wiring harness, in accordance with an exemplary window height embodiment of the present invention. Referring to the foreground, a cable exit end 47-W connects to a conduit 44-W of the conduit assembly 40-W. The conduit connector 42-W extends into a backshell slot 37-W. The top wall 32-W of the backshell 30-W is above slot 37-W and a front edge 33-W of the slot is shown. A top edge 33-1-W of the slot 37-W is displaced from the conduit connector 42-W while the bottom edge 33-2-W is readily seen in the foreground. Beneath the slot 37-W is a coupling nut 20-W. And still below the coupling nut 20-W, an electrical interfacing connector 60-W is shown. The type of interfacing electrical connector may vary across embodiments of the present invention as required or desired for a given application. As with the rotation adapter and helical embodiments, Connector types in accordance with embodiments, to include window height embodiments, include, but are not limited to, MIL-DTL-38999 series III plug connectors. In accordance with another exemplary embodiment, the cable exit end 47-W houses a cable which extends to a testing equipment connector, not shown.

Figure 8B:
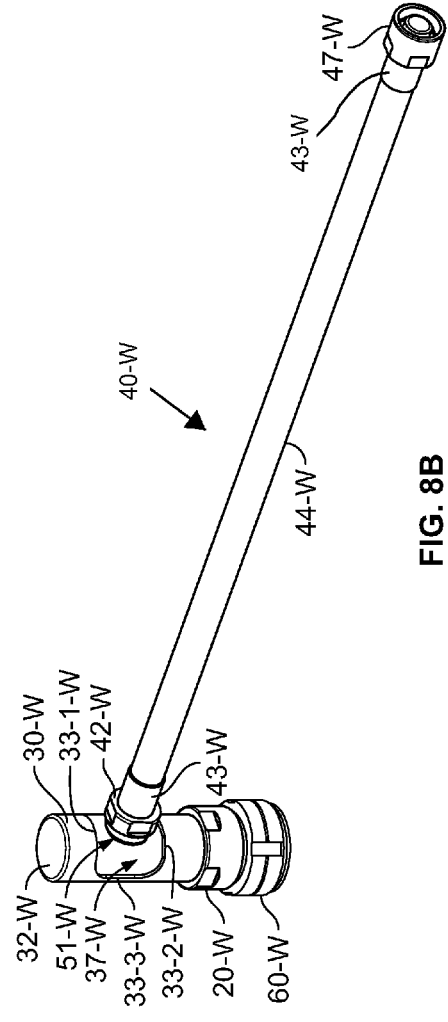
FIG. 8B illustrates a right front perspective view of a wiring harness, in accordance with an exemplary window height embodiment of the present invention.

FIG. 8B illustrates a right front perspective view of the wiring harness shown in FIG. 8A, in accordance with an exemplary window height embodiment of the present invention. The coupling nut 20-W is in the back ground and secures electrical interfacing connector 60-W, below, to the backshell 30-W, above. A back edge 33-3-W of the window backshell slot 37-W is shown left of the conduit connector 42-W. Conduit connector 42-W fits through the backshell slot 37-W and affixes into receptacle point 51-W of the cylinder, housed within the backshell 30-W. A top edge 33-1-W and a bottom edge 33-2-W of window slot 37-W are also shown above and below, respectively, the conduit connector 42-W. A top wall 32-W of the backshell 30-W is above the top edge 33-1-W of the slot 37-W. The conduit 44-W of the conduit assembly 40-W is shown extending from its conduit connector 42-W to its exit end 47-W. Flanking each end of conduit 44-W are outer fittings 43-W.

Figure 8C:
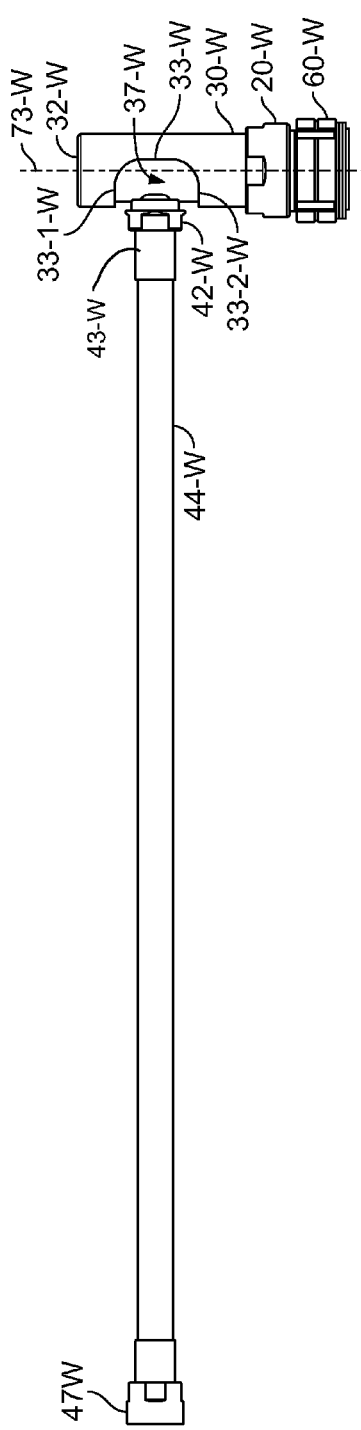
FIG. 8C illustrates a side view of a wiring harness, in accordance with an exemplary window height embodiment of the present invention.

FIG. 8C illustrates a side view of a wiring harness, in accordance with an exemplary window height embodiment of the present invention. From the left, exit end 47-W of the cable conduit connects to the conduit 44-W which extends into an outer fitting 43-W, which connects to a threaded conduit connector 42-W. Conduit connector 42-W is shown passing through the backshell slot 37-W. A front edge 33-W of the backshell slot 37-W is spaced from the conduit connector 42-W in this side view. Here, in a window embodiment the conduit connector is spaced from a top slot edge 33-1-W and a bottom slot edge 33-2-W. The coupling nut 20-W secures a bottom end of a backshell 30-W to the electrical interfacing connector 60-W. In accordance with the exemplary embodiment shown in FIG. 8C, the top 32-W of the backshell 30-W is relatively close to a top edge of a slot 37-W, affording a low profile for the rotatable adapter wiring harness. Coupling nut 20-W provides the mechanical connection between the backshell 30-W and the interface connector 60-W. In accordance with a window embodiment of the present invention, the cable conduit can swivel about a center axis 73-W of the backshell-cylinder assembly as well as move in a direction parallel to the center axis 73-W.

Figure 8D:
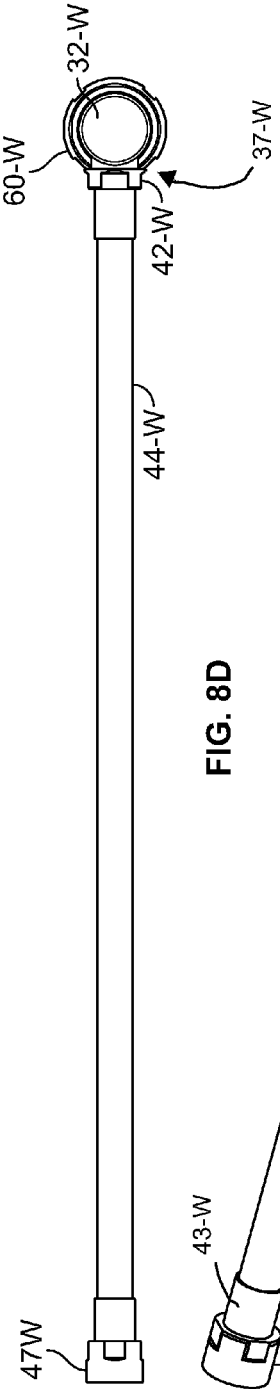
FIG. 8D illustrates a top view of a wiring harness, in accordance with an exemplary window height embodiment of the present invention.

FIG. 8D illustrates a top view of the wiring harness shown in FIGS. 8A-8C, in accordance with an exemplary window height embodiment of the present invention. The length of the conduit 44-W is shown with the exit end 47-W on the left and the conduit connector 42-W on the right. The conduit connector is shown passing through the slot 37-W to attach to the cylinder, not shown. The top wall 32-W of the backshell can be seen as well as an outer edge of the electrical interface connector 60-W.

Figure 9A:
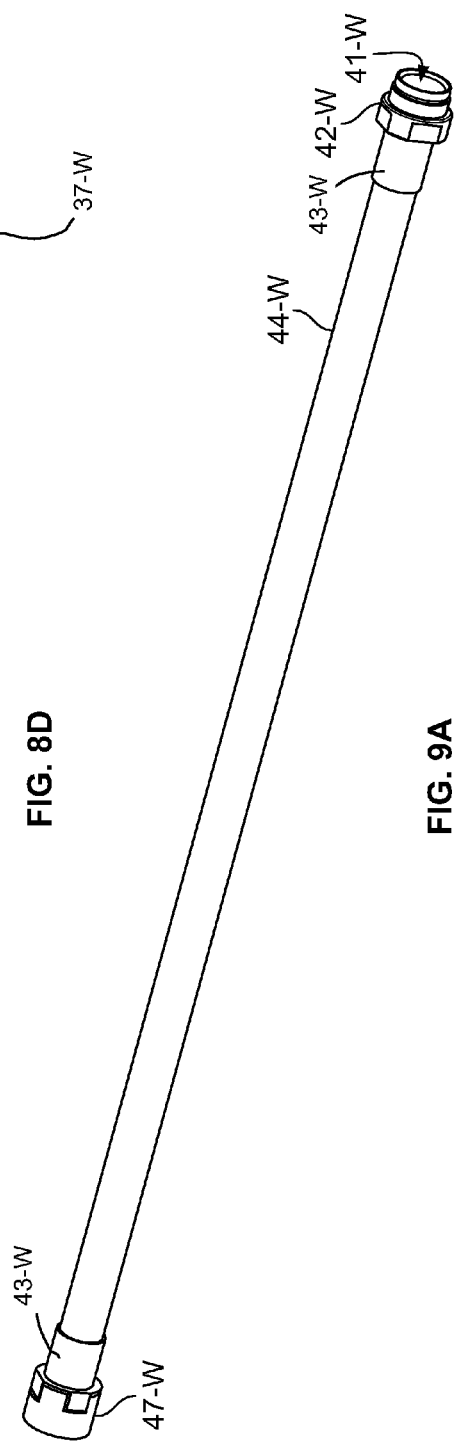
FIG. 9A illustrates a right front perspective view of a conduit with conduit connector in accordance with an exemplary window embodiment of the present invention.

FIG. 9A illustrates a right front perspective view of a conduit assembly 40-W in accordance with an exemplary window height embodiment of the present invention. Conduit 44-W has an exit end 47-W and a conduit connector 42-W on its opposite end. Flanking each end of conduit 44-W are outer fittings 43-W. The attachment end 41-W of the conduit connector 42-W connects to cylinder 50-W, not shown. In accordance with an exemplary embodiment of the present invention 42-W is threaded at its insertion end, as described below with reference to FIG. 9C.

Figure 9B:
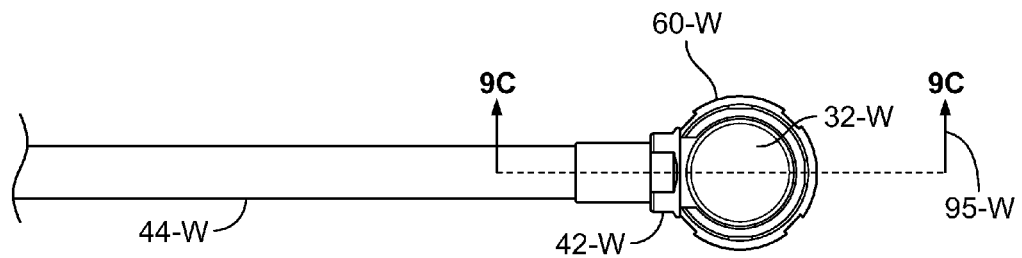
FIG. 9B illustrates a partial top view of a wiring harness showing cross sectional line 9C-9C, in accordance with an exemplary window embodiment of the present invention.
Figure 9C:
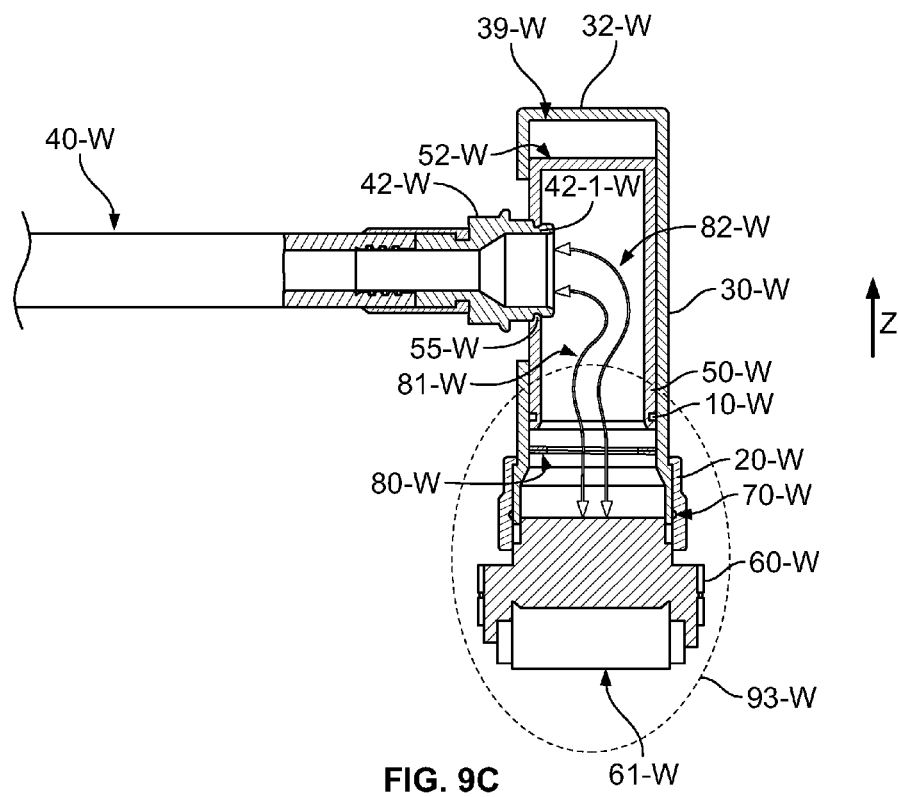
FIG. 9C illustrates a cross sectional view along line 9C-9C in FIG. 9B of a wiring harness, in accordance with an exemplary window embodiment of the present invention.

FIG. 9B illustrates a partial top view of a wiring harness showing cross sectional line 9C-9C, in accordance with an exemplary window embodiment of the present invention. The partial top view shows a portion of the conduit assembly 40-W cable conduit 44-W which extends into an outer fitting 43-W, which connects to a threaded conduit connector 42-W. The conduit connector 42-W is inserted through the backshell; the cylinder, housed within the backshell, is not shown but the top of the backshell 32-W and the outer edge of the electrical interface connector 60-W are identified. A cross section is taken along line 9C-9C 95-W and the resulting cross sectional view is shown in FIG. 9C FIG. 9C illustrates a cross sectional view along line 9C-9C in FIG. 9B of a wiring harness, in accordance with an exemplary window embodiment of the present invention. This view shows a portion of the conduit assembly 40-W with the conduit connector 42-W inserted through the backshell 30-W and into the cylinder 50-W. As in FIGS. 3C and 6C, the mechanical connection between the conduit connector 42-W and the cylinder 50-W is shown simplified as an indent 42-1-W into edge 55-W of cylinder 50-W. In accordance with an exemplary embodiment, the mechanical connection of the conduit connector 42-W to the cylinder insertion point, receptacle, is external threads on the conduit connector mated to internal threads in the cylinder, not shown in FIG. 9C but shown in FIG. 3E. An outside surface of a top side 52-W of the cylinder 50-W is displaced from an inside surface 39-W of top wall 32-W of the backshell 30-W.

In contrast to the rotatable adapter and the helical embodiments the slot height of the window embodiment affords movement of the conduit perpendicular to a connection face 61-W of the interface connector 60-W in the Z direction. O-ring 10-W provides a seal between an outer circumference of the cylinder 50-W and an inner circumference of the backshell 30-W. The backshell coupling nut 20-W joins the interface connector 60-W to the backshell 30-W. Retaining ring 80-W acts as a vertical stop for the cylinder relative to the backshell in the negative Z direction. The cylinder 50-W acts as a swivel bushing in accordance with embodiments of the present invention. O-ring 70-W provides a seal between the backshell 30-W and the coupling nut 20-W. The lower portion of the wiring harness 93-W is shown in greater detail in FIG. 9E and described in more detail with reference to the same. The coupling of the backshell 30-W to the electrical connector 60-W is shown in greater detail in FIG. 9E. Referring again to FIG. 9C, also shown are anti-rotational teeth 31-W-a, which are further described below in reference to FIG. 17 and their position on the harness is discussed below with reference to FIG. 9E.

Figure 9D:
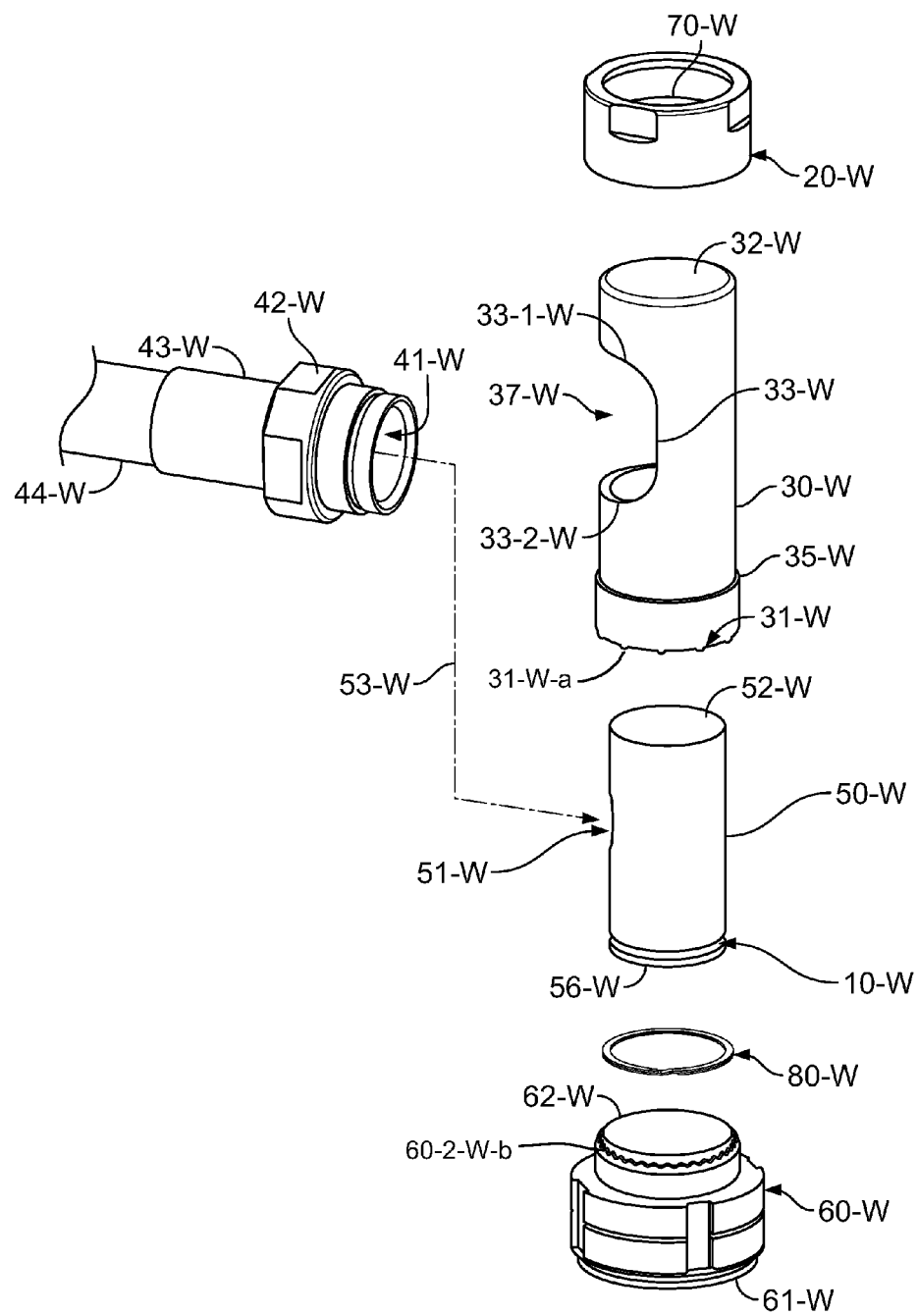
FIG. 9D shows an exploded view of a of a wiring harness, in accordance with an exemplary window embodiment of the present invention.

FIG. 9D shows an exploded view of a window wiring harness, in accordance with an exemplary window embodiment of the present invention. An outer surface of a top side 52-W of the cylinder 50-W is shown beneath bottom edge 31-W of the backshell 30-W. The coupling nut 20-W is shown above an outer surface of a top side 32-W of backshell 30-W. In accordance with the exemplary window embodiment shown in FIG. 9D, an o-ring 70-W is seated inside the coupling nut 20-W. Bottom edge 56-W of cylinder 50-W and o-ring 10-W are shown in greater detail in FIG. 9E. Referring again to FIG. 9D, the electrical contact end 61-W of the electrical interfacing connector 60-W is shown beneath the retaining ring 80-W. The top 62-W of the interface connector 60-W fits into the bottom 31-W of the backshell and is secured to the backshell by coupling nut 20-W. Above bottom edge 31-W is a lower edge 35-W of the backshell, described in greater detail with reference to FIG. 9E. Along the bottom edge 31-W of the backshell 30-W are anti-rotational teeth 31-W-a, shown in FIG. 9C, which mate with the anti-rotational teeth 60-2-W-b, shown in FIG. 9C, of the connector 60-W.

The attachment end 41-W of the conduit connector 42-W connects to cylinder 50-W at receptacle point 51-W, as indicated by line 53-W. Conductor conduit 44-W is shown connected to conduit connector 42-W via outer fitting 43-W. Open slot 37-W of the backshell 30-W aligns with the receptacle point 51-W of the cylinder 50-W when the wiring harness is assembled. A top edge 33-1-W and a bottom edge 33-2-W of slot 37-W are shown and may be used as vertical stops, in accordance with exemplary embodiments of the present invention.

Figure 9E:
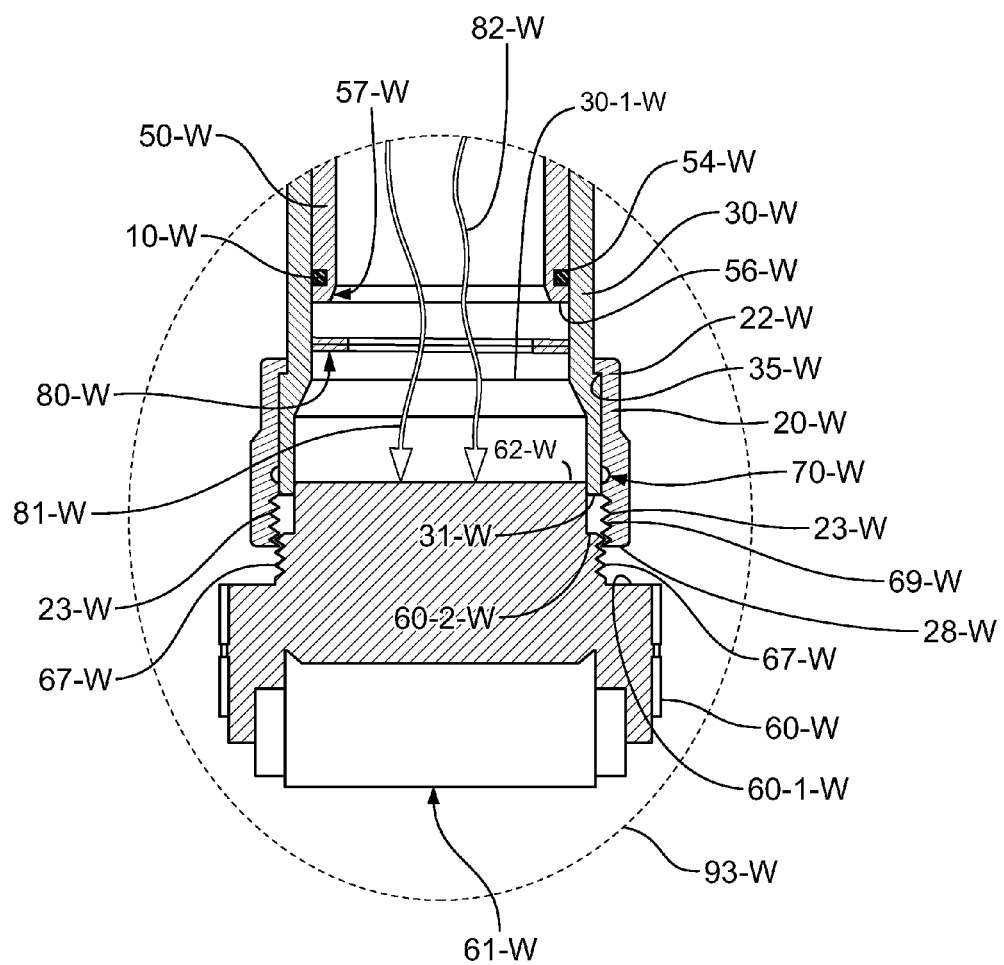
FIG. 9E shows a portion of FIG. 9C in greater detail, in accordance with an exemplary embodiment of the present invention.

The mechanical coupling between the cylinder and backshell are further described with reference to FIG. 9E, which shows portion 93-W of FIG. 9C in greater detail, in accordance with an exemplary embodiment of the present invention. Cylinder 50-W has a chamfered 57-W bottom end 56-W along its inner circumference. The cylinder 50-W is housed in the backshell 30-W. In this view, wires 81-W and 82-W are shown in the center of the cylinder and backshell, where said wires extend to make electrical contact with the connector 60-W. Electrical connector 60-W is shown as a solid cross section block to simplify the drawing. The connector 60-W may be of a conventional configuration. O ring 10-W provides a seal between an outer circumference of the cylinder 50-W and an inner circumference of the backshell 30-W, while O-ring 70-W provides a seal between the backshell 30-W and the coupling nut 20-W.

The connector 60-W, in accordance with an exemplary embodiment has external threads 67-W at the end opposite the connection face 61-W. These external threads 67-W mate with internal threads 23-W of the coupling nut 20-W. Coupling nut 20-W has a collar 22-W at its top end which catches on ledge 35-W of the backshell 30-W. The bottom edge 31-W of the backshell is shown spaced above ledge 60-2-W of the connector 60-W before full mating of threads for mechanical coupling of the backshell to the connector 60-W. Similarly, ledge 60-1-W of the connector 60-W is shown spaced above bottom edge 28-W of the coupling nut 20-W. Along ledge 60-2-W of the connector 60-W are anti-rotational teeth, not shown, which mate with the anti-rotational teeth on the bottom edge 31-W of the back shell 30-W, not shown. A top 62-W of the electrical connector is shown displaced from retaining ring 80-W and fully inserted into the backshell 30-W.

FIGS. 10A-10C show rotational views of a window height embodiment of the present invention. FIG. 10A illustrates a left front perspective rotational view of a wiring harness, in accordance with an exemplary window embodiment of the present invention. The cable conduit 44-W extends into the foreground. The conduit adapter 42-W fits through slot 37-W of the backshell 30-W. The conduit connector 42-W is shown in the middle range of the slot 37-W, where a front edge 33-W provides a rotational stop for a counter clockwise 36-3-W direction. Similarly a back edge, not shown, of slot 37-W provides a stop for maximum clockwise rotation position 36-2-W. The conduit connector 42-W is also shown displaced from a top edge 33-1-W and a bottom edge 33-2-W of slot 37-W, which may be used as vertical stops, in accordance with exemplary embodiments of the present invention. Also shown in the subject embodiment is a relatively low profile of the wiring harness; for example, a top side 32-W of the backshell 30-W is relatively close to a top edge of the slot 37-W. Coupling nut 20-W is shown below the backshell 30-W and secures the same to the interface connector 60-W. The embodiment of FIGS. 10A-10C affords a rotation span 36-W near 130 degrees.

FIG. 10B illustrates an inverted front rotational view of a wiring harness, in accordance with an exemplary window embodiment of the present invention. A top side 32-W of the backshell 30-W is now shown below conduit connector 42-W. In accordance with the exemplary embodiment of FIGS. 10A-10C, the external diameter of the insertion portion of the conduit connector 42-W is smaller than vertical 77-W open distance of the slot 37-W. In accordance with an exemplary embodiment, the vertical 77-W distance of the window slot is 1.50 inches. Also in accordance with an exemplary embodiment of the present invention, a vertical excursion 36-1-W for the cable conduit of 0.68 inches is afforded with a cable conduit diameter 42-A-d, shown for example in FIG. 3E, of 0.82 inches. Referring again to FIG. 10B, coupling nut 20-W is shown, here, above the backshell 30-W and secures the backshell 30-W to the interface connector 60-W. The connection face 61-W of the connector 60-W is at the top in this view.

FIG. 10C illustrates a top rotational view of a wiring harness, in accordance with an exemplary window embodiment of the present invention. A top surface 32-W of the backshell is shown above conduit connector 42-W. A rotation span 36-W of about 130 degrees is provided by the subject exemplary embodiment. The rotational span of any embodiments of the present invention can range from a minute rotation of single digit degrees to an angle of greater than 180 degrees. Conduit connector 42-W is shown inserted through slot 37-W of the backshell. The entire conduit assembly 40-W swings through the rotation angle upon swiveling of the wiring harness. Conduit 44-W fits into outer fitting 43-W which is secured to an end conduit connector 42-W.

In accordance with the embodiment of FIGS. 7A-7C, if the conduit connector 42-H is in the front portion of the slot, towards front edge 33-H, it is farther away in the Z direction from the face 61-H of the interface connector 60-H. If conduit connector 42-H is against a back edge 33-3-H of the helical slot, then the conduit connector 42-H is closer in the Z direction to the face of the interface connector. In the embodiment of FIGS. 7A-7C the conduit moves away from the interface connector with a counter clockwise rotation 97-H. In alternate embodiments, the helical slot may increase the distance of the conduit from the interface connector with a clockwise rotation. The helical shaped slot allows the cable to avoid obstructions side to side as well as front to rear, relative to the interfacing connector.

In helical embodiments of the present invention and in rotational adapter embodiments of the present invention, the front edge and the back edge of the respective slots can provide positive lateral rotation stops for the swivel. The slot front and back edges of a window slot may also provide positive lateral rotation stops for the swivel. In the helical and window embodiments, since the cylinder is moving upwards and downwards in the Z direction, FIGS. 7A-C and 10A-C, the outer side of the top surface of the cylinder can make contact with the inside of the top wall of the backshell, in accordance with exemplary embodiments of the present invention. The slot itself may also provide the positive stops for movement in the Z direction. Alternatively a retaining ring, for example 80-W, shown in FIG. 9E, may serve as a lower vertical displacement stop.

In accordance with the present invention, embodiments may enable repositioning of the conduit connector via rotation in the X-Y plane, where the face or electrical contact points of the interface connector are also in the X-Y plane, as in the rotational adapter described above and shown in FIGS. 2A-4C. In accordance with a rotational adapter embodiment this repositioning can be made in real time during field applications and may even be performed when the interfacing connector is electrically connected to a test point connector.

Embodiments of the present rotatable wiring harness may be sealed from environmental factors using, for example, o-rings, as illustrated in FIG. 3C, and thread sealant. Exemplary embodiments of the present invention may also provide shielding the testing cable from electromagnetic interference. For example, plating of the cylinder, backshell, and conduit assembly with a conductive metal and using a conductive o-ring between the cylinder and backshell may provide effective electromagnetic interference shielding.

In accordance with an exemplary embodiment of the present invention, a given conduit assembly 40-A, 40-H, or 40-W is interchangeable and can be combined with different sets of cylinder-backshells, each backshell providing a different slot configuration and respective cylinders accommodating the slot excursions.

Figure 11:
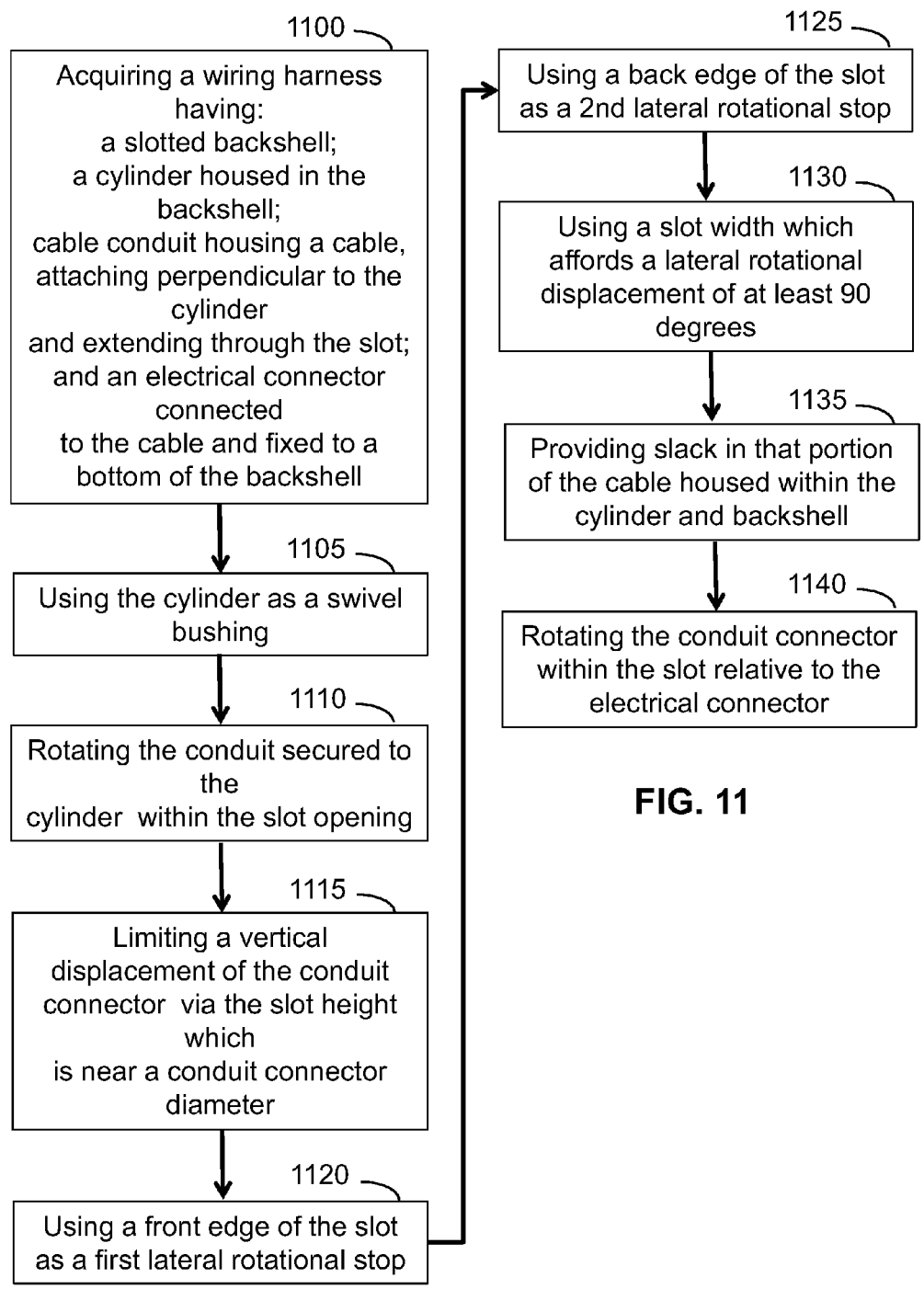
FIG. 11 illustrates an exemplary method for swiveling an electrical harness in accordance with an exemplary rotatable adapter embodiment of the present invention.

FIG. 11 illustrates an exemplary method for swiveling an electrical harness in accordance with an exemplary rotatable adapter embodiment of the present invention. A method of swiveling a rotatable adapter wiring harness includes acquiring a wiring harness with: a slotted backshell; a cylinder housed in the backshell; a cable conduit housing a cable and joined perpendicular to the cylinder and extending through the slot; and an electrical connector connected to the cable and fixed to a bottom of the backshell 1100. Further, the method continues by using the cylinder as a swivel bushing 1105 and rotating the conduit secured to the cylinder within the slot opening 1110 to swivel a rotatable adapter wiring harness. An exemplary method may further include limiting vertical displacement of the conduit connector via a slot height which is near a conduit connector diameter 1115. Limitation of lateral rotation is also desirable; hence the exemplary method provides using a front edge of the slot as a first lateral rotational stop 1120 and using a back edge of the slot as a second lateral rotational stop 1125. An exemplary method further includes a minimum rotation, using a slot width which affords a lateral rotational displacement of the conduit connector within the slot of at least 90 degrees 1130. In alternate embodiments a maximum lateral rotation can be as little as single digit degrees or in still alternate embodiments 180 degrees rotation maybe enabled. By providing a slack in that portion of the cable housed within the cylinder and backshell 1135, torsional and or tensile stress on the conducting wires is minimal and the integrity of the cable is preserved across repeated manipulations of the wiring harness 1140, such as the rotating of the conduit connector within the slot relative to the electrical connector.

Figure 12:
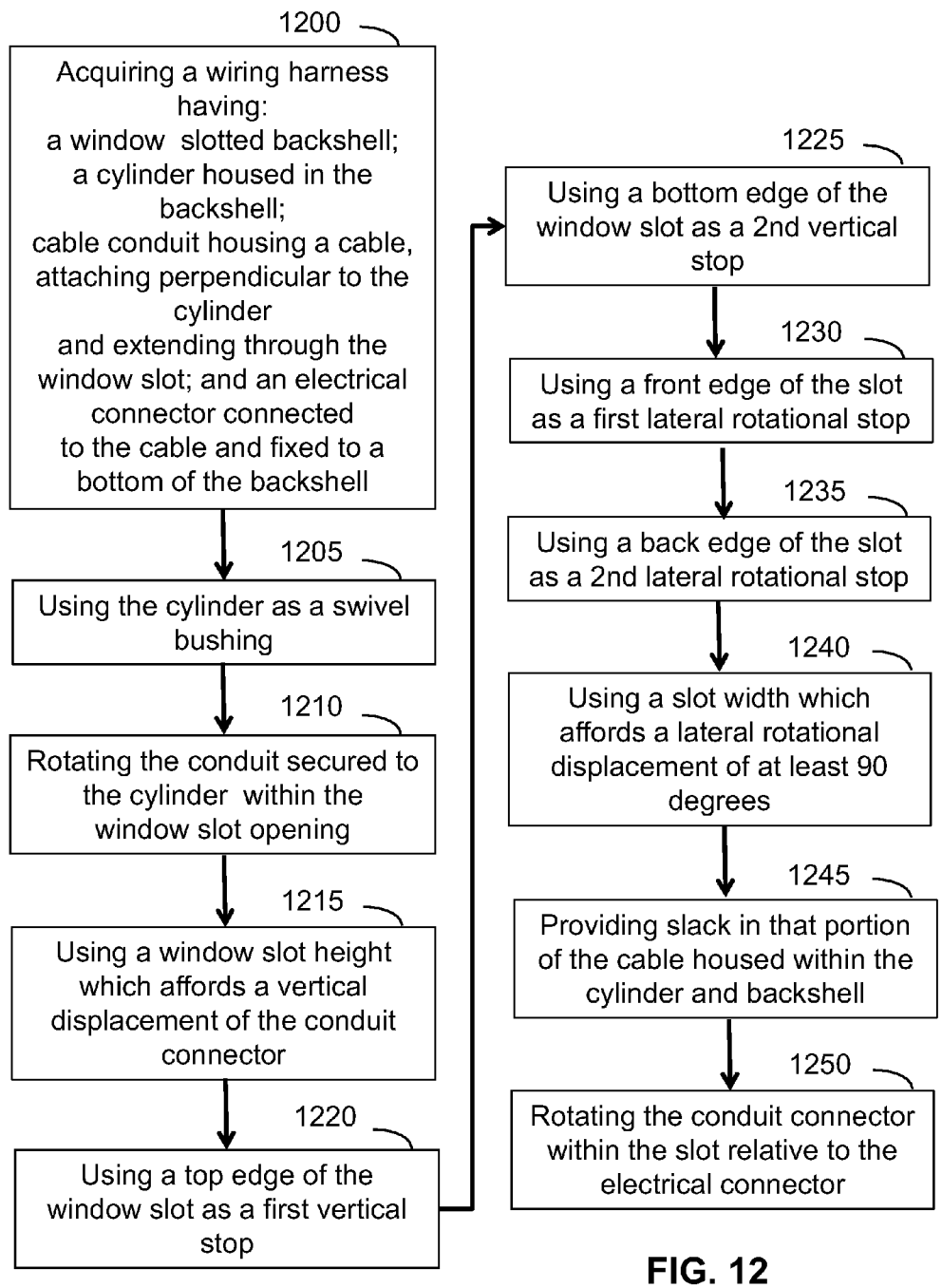
FIG. 12 illustrates an exemplary method for swiveling an electrical harness in accordance with an exemplary window height helical embodiment of the present invention.

FIG. 12 illustrates an exemplary method for swiveling an electrical harness in accordance with an exemplary window embodiment of the present invention. A method of rotating a wiring harness includes acquiring a wiring harness with: a window slotted backshell; a cylinder housed in the backshell; a cable conduit housing a cable and joined perpendicular to the cylinder and extending through the window slot; and an electrical connector connected to the cable and fixed to a bottom of the backshell 1200. By using the cylinder as a swivel bushing 1205, the user can turn the cable conduit within the window slot 1210 relative to the electrical connector. The exemplary method further includes using a slot height which affords vertical displacement of the conduit connector within the window slot 1215. Positive stops for displacement of the conduit connector, in accordance with the exemplary embodiment of FIG. 12 may be provided as follows: using a top edge of the window slot as an upwards, or first, vertical stop 1220, using a bottom edge of the window slot as a downwards, or second, vertical stop 1225; using a front edge of the window slot as first lateral rotational displacement stop 1230; and using a back edge of the window slot as a second lateral rotational displacement stop 1235. The range of the lateral rotational displacement may be determined by the width of the slot, in accordance with the exemplary method of FIG. 12, using a slot width which affords a lateral rotational displacement of at least 90 degrees 1240 is desired. In alternate embodiments, a narrower slot width or a wider slot width may be used. Providing slack in that portion of the cable housed within the cylinder and the backshell 1245 reduces stress on the cable associated with movement of the conduit and cylinder while rotating the conduit connector within the slot relative to the electrical connector 1250.

Figure 13:
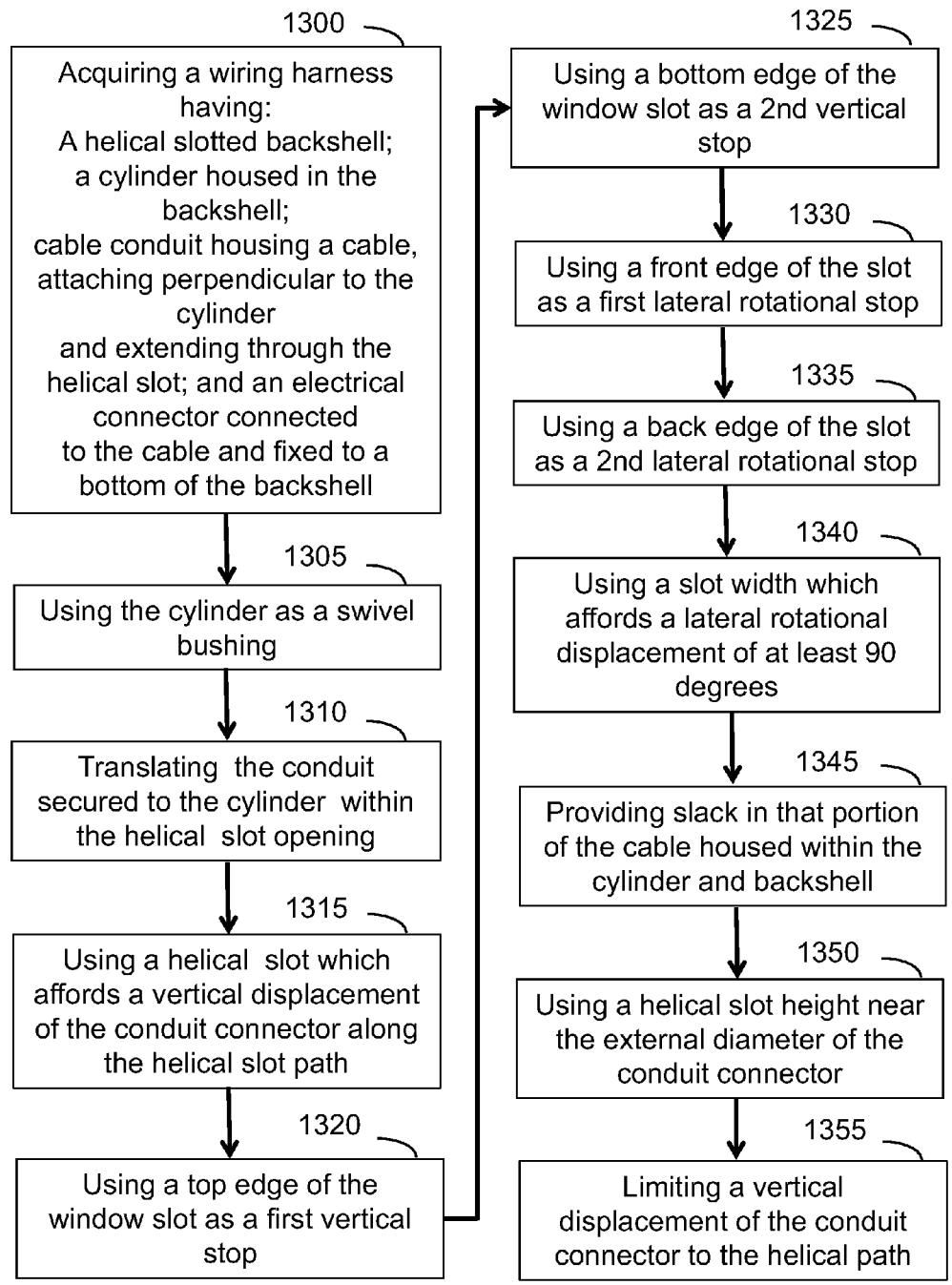
FIG. 13 illustrates an exemplary method for swiveling an electrical harness in accordance with an exemplary helical embodiment of the present invention.

FIG. 13 illustrates an exemplary method for swiveling an electrical harness in accordance with an exemplary helical embodiment of the present invention. An exemplary method to rotate a wiring harness in a helical pattern, in accordance with an exemplary method of the present invention entails, acquiring a wiring harness having: a helical slotted backshell; a cylinder housed in the backshell; cable conduit housing a cable, attaching perpendicular to the cylinder, and extending through the helical slot; and an electrical connector connected to the cable and fixed to a bottom of the backshell 1300. Having acquired a harness, the method continues with using the cylinder of the harness as a swivel bushing 1305 and translating the conduit secured to the cylinder within the helical slot opening 1310. A method of swiveling a harness in accordance with the present invention may further include using a helical slot which affords a vertical displacement of the conduit connector along the helical slot path 1315, using a top edge of the window slot as a first or upper vertical stop 1320, and using a bottom edge of the window slot as a second or lower vertical stop 1325. Lateral translation can be limited by using a front edge of the slot as a first lateral rotational stop 1330 and using a back edge of the slot as a second lateral rotational stop 1335. The magnitude of the potential lateral rotation within the helical slot can be set by using a slot width which affords a desired lateral rotational displacement, for example, of at least 90 degrees 1340. The exemplary method further includes providing slack in that portion of the cable housed within the cylinder and backshell 1345, which reduces stress on the cable wires housed in the harness and electrically connected to the interface connector during displacement of the conduit and rotation of the swivel bushing, the cylinder. Limiting the vertical displacement of the conduit connector to the helical path 1355 can be achieved by using a helical slot height near the external diameter of the conduit connector 1350.

Figure 14:
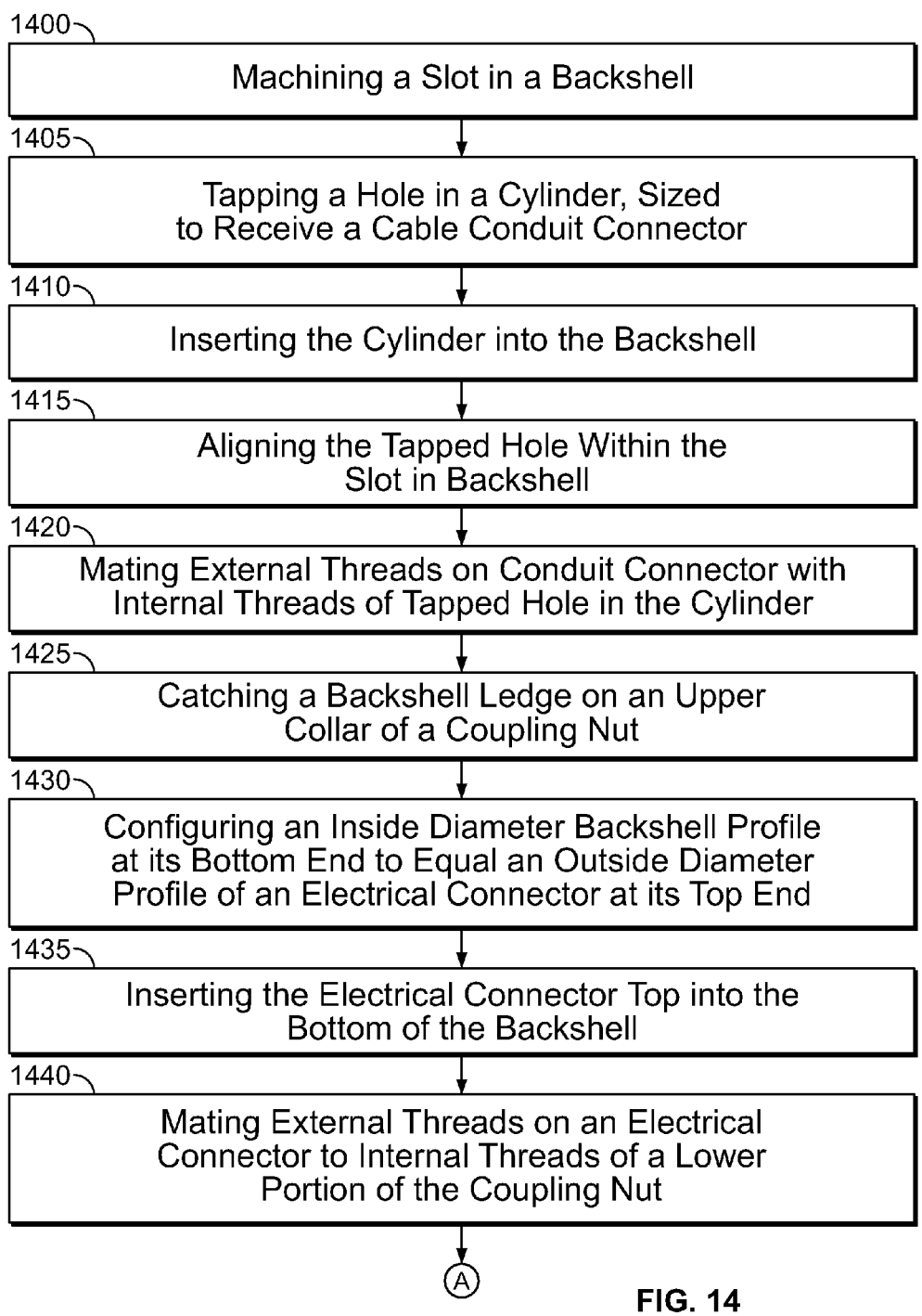
FIG. 14 illustrates an exemplary method of manufacturing a rotatable adapter embodiment of an electrical harness in accordance with an exemplary embodiment of the present invention.
Figure 14:
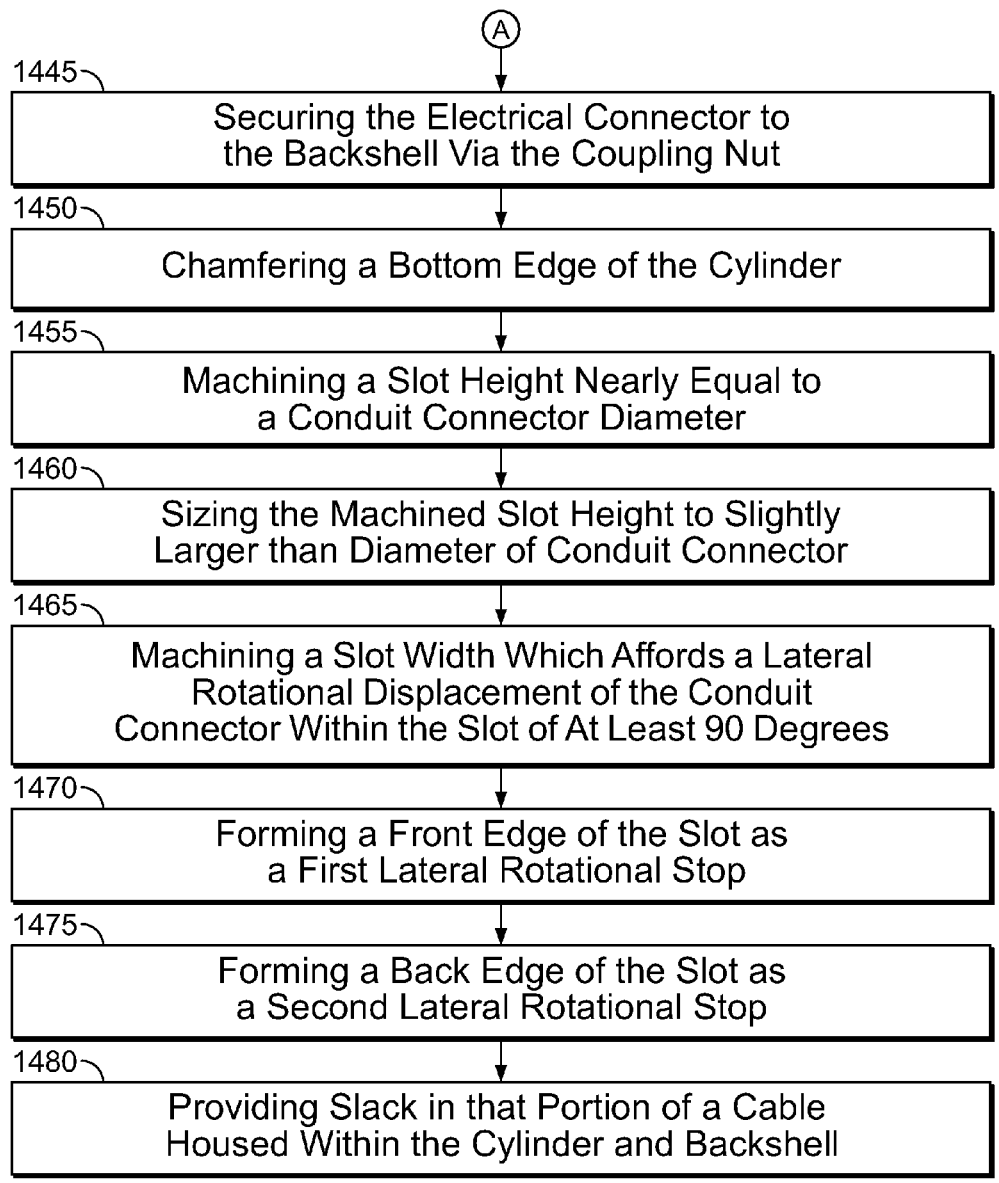

FIG. 14 illustrates an exemplary method of manufacturing a rotatable adapter embodiment of an electrical harness in accordance with an exemplary embodiment of the present invention. The method includes machining a slot in a backshell 1400 and tapping a hole in a cylinder, sized to receive a cable conduit connector 1405. Manufacturing continues with inserting the cylinder into the backshell 1410, aligning the tapped hole within the slot in backshell 1415, and mating the external threads on the conduit connector with the internal threads of the tapped hole in the cylinder 1420. The backshell, in accordance with embodiments of the present invention has an external step on its lower end; catching this backshell ledge on an upper collar of a coupling nut 1425 is part of the exemplary method as shown in FIG. 14. A top of an electrical connector employed in a wiring harness in accordance with embodiments of the present invention has a tapered top 62-A, as shown, for example, in FIG. 3D. Referring again to FIG. 14, configuring an inside diameter backshell profile at its bottom end to equal an outside diameter profile of an electrical connector at its top end 1430 and inserting the electrical connector top into the bottom of the backshell 1435 seats the electrical connector into the backshell. Then, mating external threads on an electrical connector to internal threads of a lower portion of the coupling nut 1440 and securing the electrical connector to the backshell via the coupling nut 1445 mechanically secures the electrical connector to the backshell of the harness. The manufacturing method may further include chamfering a bottom edge of the cylinder 1450.

Machining a slot height nearly equal to a conduit connector diameter 1455 can provide a limiting of vertical displacement of the conduit connector via the height of the slot 1460. Limiting the rotation of the harness can be provided by the slot configuration. Machining a slot width which affords a lateral rotational displacement of the conduit connector within the slot of at least 90 degrees 1465 and using a front edge of the slot as a first lateral rotational stop 1470 and a back edge of the slot as a second lateral rotational stop 1475 may be employed in a manufacturing method, in accordance with an exemplary embodiment of the present invention. And finally, though not necessarily last, providing slack in that portion of a cable housed within the cylinder and the backshell 1480 reduces stress in the housed wiring and in turn improves reliability with repeated use. The method of providing slack in the cable housed within the cylinder and backshell may be used in all method embodiments for manufacturing a rotatable adapter, helical or window wiring harness in accordance with the present invention.

Figure 15:
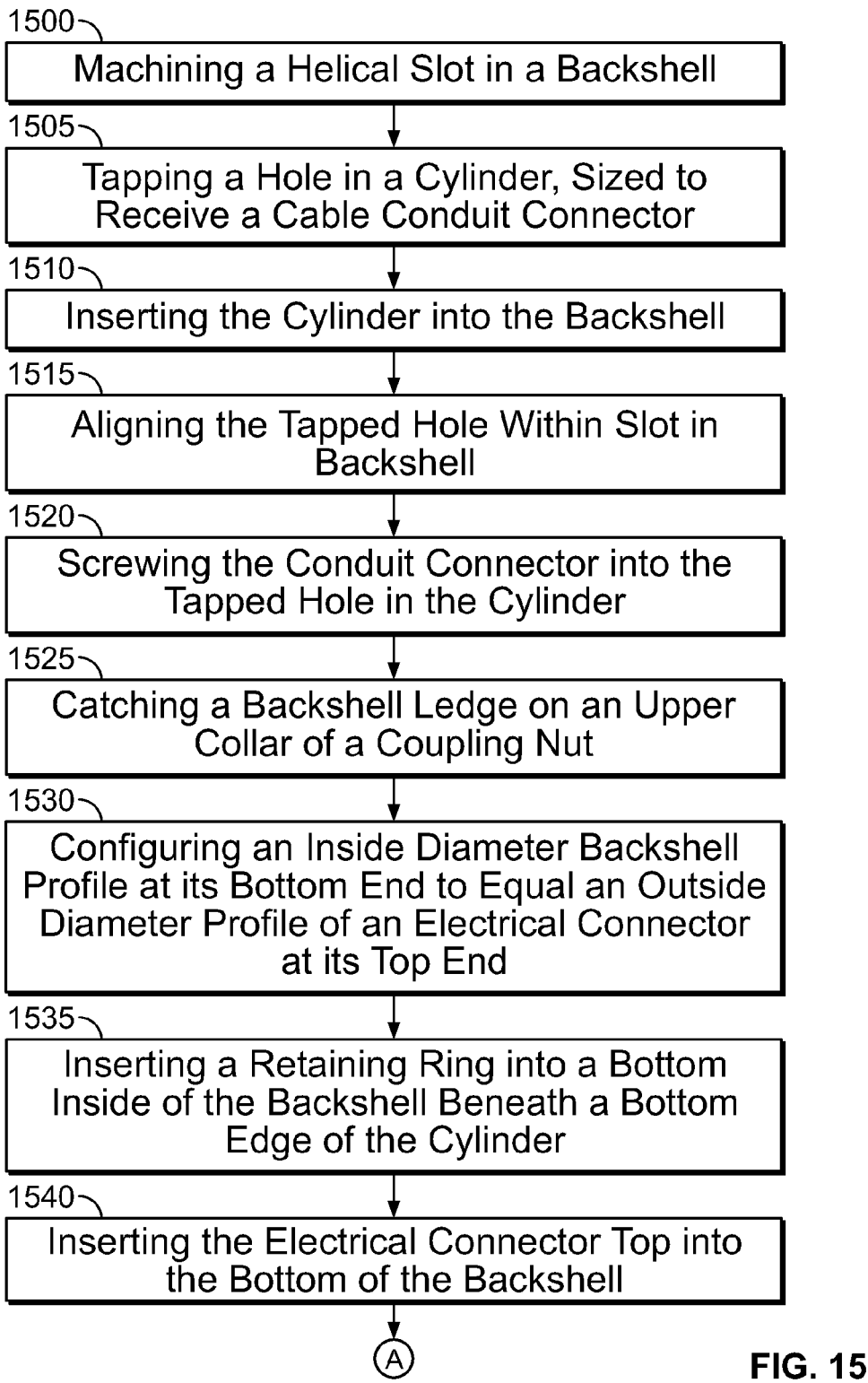
FIG. 15 illustrates an exemplary method of manufacturing a helical embodiment of an electrical harness in accordance with an exemplary embodiment of the present invention.
Figure 15:
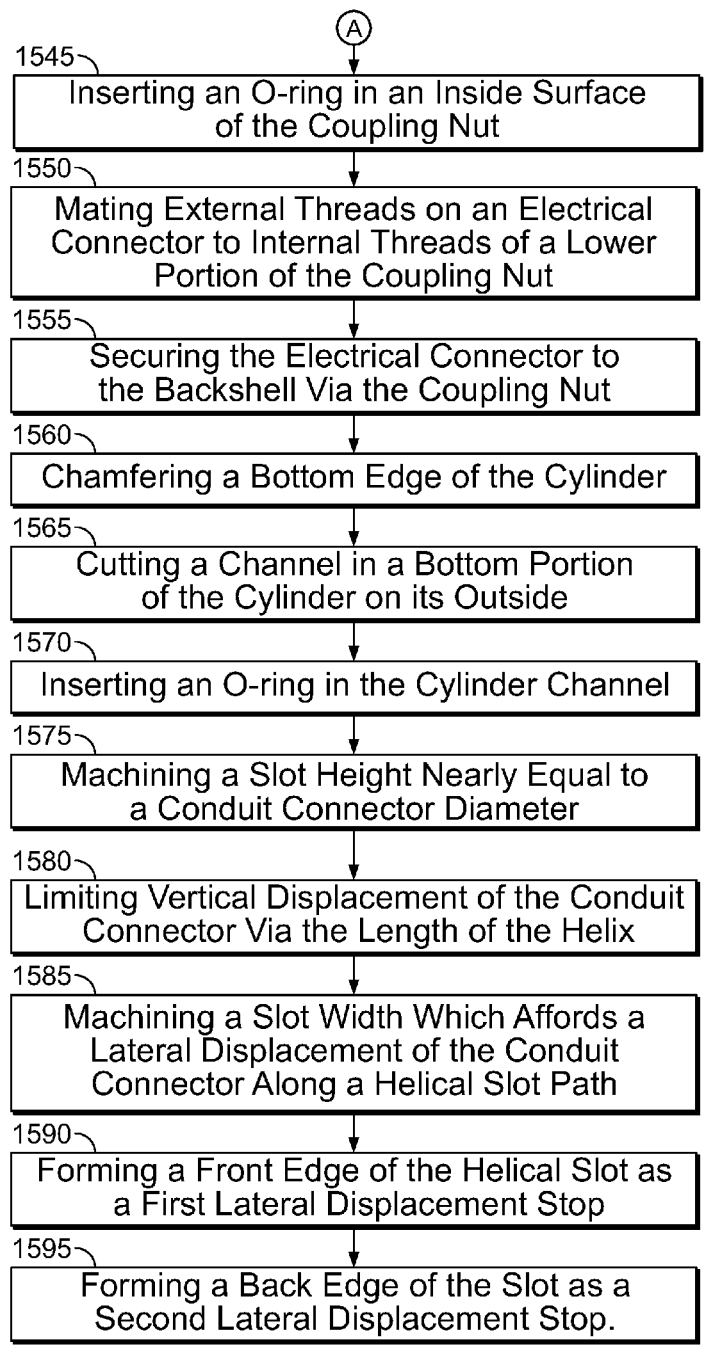

FIG. 15 illustrates an exemplary method of manufacturing a helical embodiment of an electrical harness in accordance with an exemplary embodiment of the present invention. The method may begin with machining a helical slot in a backshell 1500 and tapping a hole in a cylinder, sized to receive a cable conduit connector 1505. The method as described and shown in FIG. 15 need not be performed in numerical order. With a slot present, inserting the cylinder into the backshell 1510 and aligning the tapped hole within the helical slot in backshell 1515 readies the receptacle in the cylinder for the conduit connector such that screwing the conduit connector into the tapped hole in the cylinder will mechanically secure the cable housing conduit to the cylinder 1520. The backshell in a helical embodiment in accordance with the present invention has an outer step or ledge 35-H at its lower end, shown for example in FIG. 6D. Also shown in FIG. 6D is a tapered top end 62-H of the electrical interface connector of the present invention. Referring again to FIG. 15, Configuring an inside diameter backshell profile at its bottom end to equal an outside diameter profile of an electrical connector at its top end 1530, inserting a retaining ring into a bottom inside of the backshell beneath a bottom edge of the cylinder 1535, inserting the electrical connector top into the bottom of the backshell 1540 seats the electrical connector in the harness. Then, catching a backshell ledge on an upper collar of a coupling nut 1525 and mating external threads on an electrical connector to internal threads of a lower portion of the coupling nut 1550 provide securing of the electrical connector to the backshell via the coupling nut 1555. In accordance with an exemplary method placing an o-ring into an inside coupling nut surface 1545 may be performed to seal the harness between the coupling nut and the backshell.

Still referring to FIG. 15, the method of manufacturing a helical wiring harness in accordance with an exemplary method of the present invention may also include chamfering an inside wall bottom edge of the cylinder 1560, cutting a channel in a bottom portion of the cylinder on its outside 1565, and/or inserting an o-ring in the cylinder channel 1570. Limiting the range of motion of the conduit connector may be desired. The present invention includes exemplary methods for limiting and facilitating the range of motion of the conduit connector with the swiveling of the cylinder to which the connector is attached. Machining a slot height near the diameter of the conduit connector 1575 affords limiting vertical displacement of the conduit connector via the length of the helix 1580. The exemplary method continues with machining a helical slot width which affords a lateral displacement of the conduit connector along the helical slot path 1585, forming a front edge of the helical slot as a first lateral displacement stop 1590, and forming a back edge of the slot as a second lateral displacement stop 1595. By using slack in the cable housed within the cylinder and the backshell, shown for example in FIG. 14 1480, motion induced stress on the cable is reduced. Using the stops to limit the range of motion contributes to limiting potential tensile and torsional stress on the cable and serves as a guide for desired cable slack.

Figure 16:
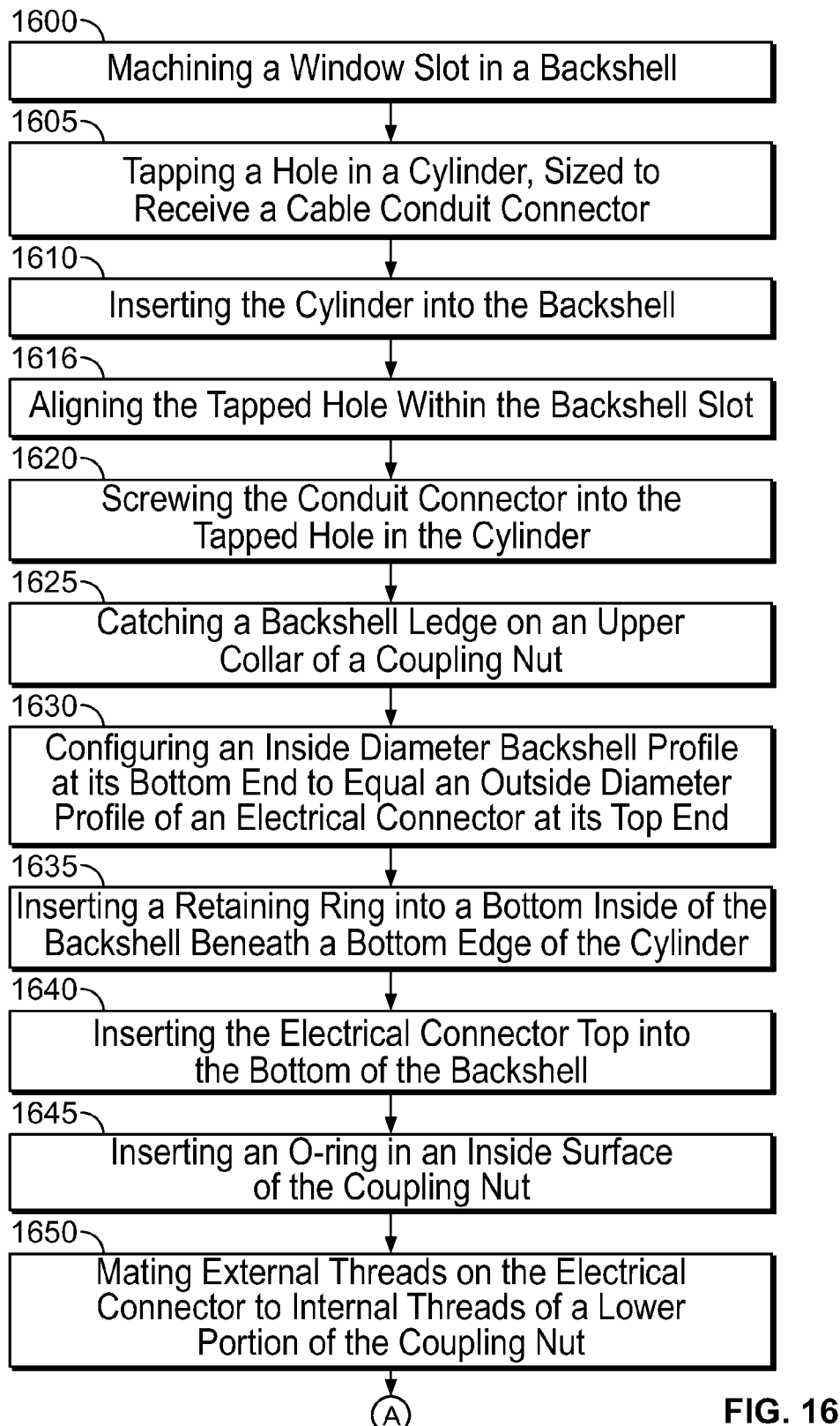
FIG. 16 illustrates an exemplary method of manufacturing a window height embodiment of an electrical harness in accordance with an exemplary embodiment of the present invention.
Figure 16:
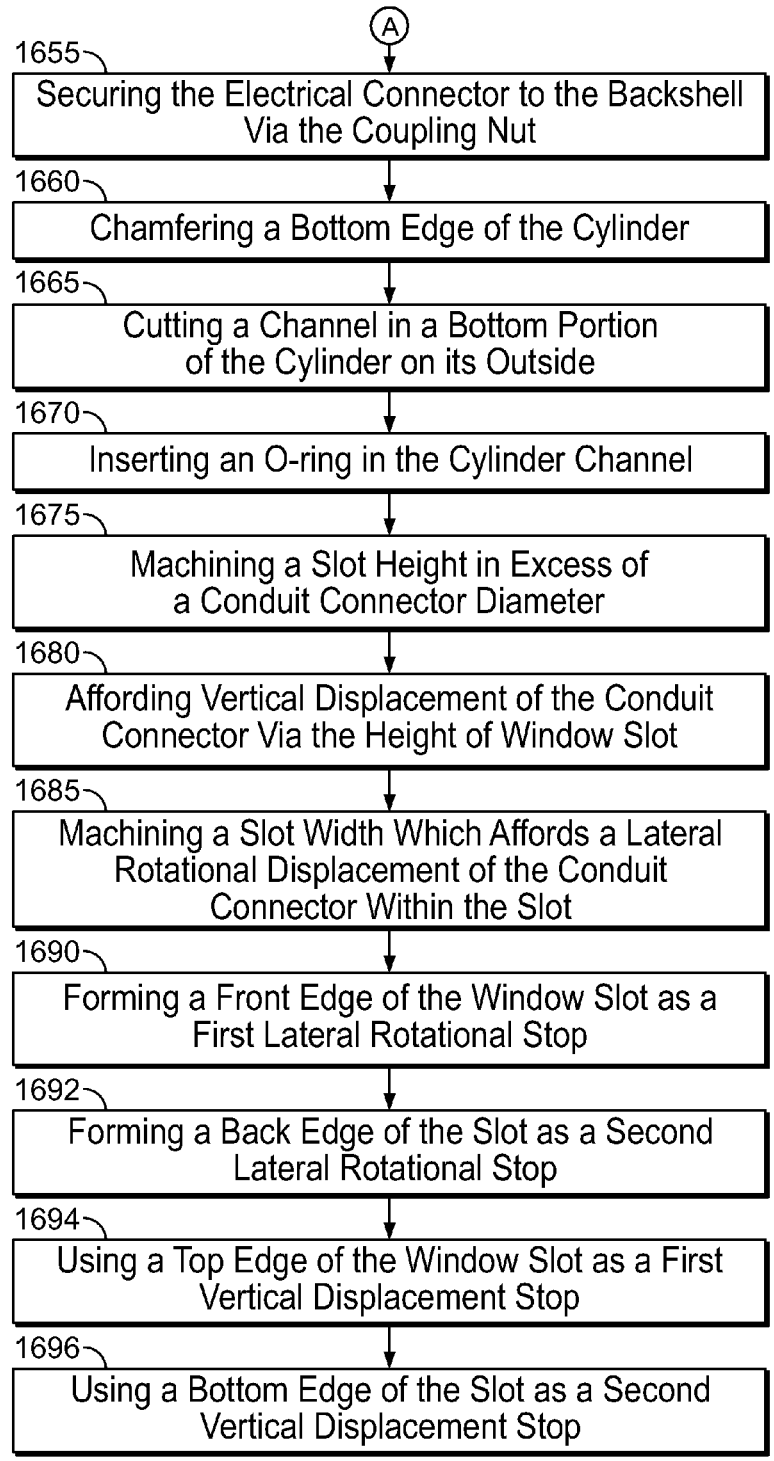

FIG. 16 illustrates an exemplary method of manufacturing a window height embodiment of an electrical harness in accordance with an exemplary embodiment of the present invention. An exemplary method of manufacturing machining a window height harness includes: machining a window slot in the sidewall of a backshell 1600; tapping a hole in a cylinder, sized to receive a cable conduit connector 1605; inserting the cylinder into the backshell 1610; aligning the tapped hole within the backshell slot 1616; and mating the external threads on a conduit connector to the internal threads of the tapped hole 1620, securing the cable housing conduit into the cylinder. The method may further include any or all of the following: catching a backshell ledge on an upper collar of a coupling nut 1625; configuring an inside diameter backshell profile at its bottom end to equal an outside diameter profile of an electrical connector at its top end 1630; inserting a retaining ring into a bottom inside of the backshell beneath a bottom edge of the cylinder 1635; inserting the electrical connector top into the bottom of the backshell 1640; inserting an o-ring in an inside surface of the coupling nut 1645; mating external threads on an electrical connector to internal threads of a lower portion of the coupling nut 1650; securing the electrical connector to the backshell via the coupling nut 1655; chamfering a bottom edge of the cylinder 1660 along its inner circumference; cutting a channel in a bottom portion of the cylinder on its outside surface 1665; inserting an o-ring into the cylinder channel 1670; machining a slot height in excess of a conduit connector diameter 1675; affording vertical displacement of the conduit connector via the height of window slot 1680; machining a slot width which affords a lateral rotational displacement of the conduit connector within the slot 1685; using a front edge of the window slot as a first lateral rotational stop 1690; using a back edge of the slot as a second lateral rotational stop 1692; using a top edge of the window slot as a first vertical displacement stop 1694; and using a bottom edge of the slot as a second vertical displacement stop 1696.

Figure 17:
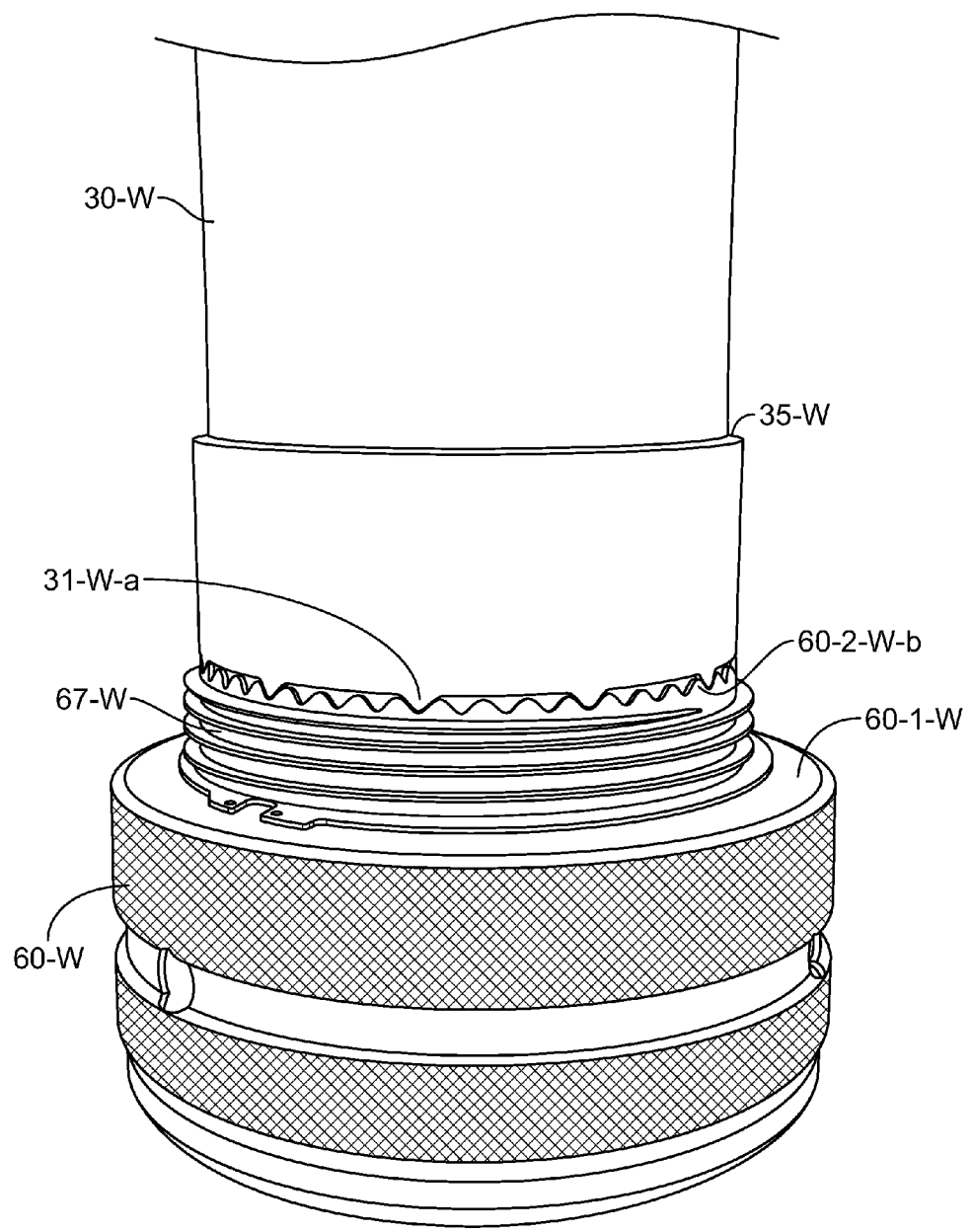
FIG. 17 shows a front perspective view of an electrical connector and backshell, in accordance with an exemplary embodiment of the present invention.

FIG. 17 shows a front perspective view of an electrical connector and a backshell, in accordance with an exemplary embodiment of the present invention. The anti-rotational teeth 31-W-a on the backshell 30-W are seated in the anti-rotational teeth 60-2-W-b on the connector 60-W. The connector 60-W is shown fully inserted into the backshell 30-W. In accordance with the exemplary embodiment shown in FIG. 17, the teeth ratio from backshell 30-W to connector 60-W is 1:5. Other ratios, to include 1:1, may be desired in alternate embodiments. The connector teeth 60-2-W-b are positioned just above the external threads 67-W of the connector 60-W upon ledge 60-2-W, ledge shown in FIG. 9E. The coupling nut is not shown in FIG. 17, permitting a clear view of the anti-rotational teeth. Referring again to FIG. 17, also shown is the ledge 35-W on the backshell 30-W. The backshell ledge 35-W which will be caught by collar 22-W of the coupling nut 20-W are shown, for example, in FIG. 9E. In accordance with exemplary embodiments of the present invention, the anti-rotational teeth across the backshell and connector interface keep the backshell from rotating relative to the connector, while swiveling of the cable conduit is afforded via the cylinder bushing. At the same time, the coupling nut keeps the backshell mechanically secured to the connector. Though shown with the window designation, helical and rotational adapter embodiments of the present invention may also incorporate an anti-rotational teeth interface between the electrical connector and the backshell.

An exemplary rotatable adapter wiring harness was manufactured and field tested on an F-22 aircraft. The interface connector was attached to the desired test point connector and the conduit was repositioned across the lateral rotational range afforded by the rotatable adapter wiring harness prototype. The wiring harness was made from aluminum. A rotation angle of 150 degrees was utilized in the field. The results of the testing protocol support a reliable performance mechanically and electrically for a wiring harness in accordance with embodiments of the present invention. Embodiments of the present invention may provide a lateral rotational angle of 270 degrees.

By providing a slack in that portion of the cable housed within the cylinder and backshell, torsional and or tensile stress on the conducting wires is reduced and the integrity of the cable is preserved across repeated manipulations of the wiring harness.

The present invention allows adjustments to be made in real time to the orientation of a cable leg with respect to an interfacing connector. When mating interfacing connectors and corresponding cable assemblies to testing connectors on an aircraft hardware may create physical access constraints and electrical components may cause signal interference issues. The ability to adjust the position of the conduit leg housing the connecting cable or the interfacing connector relative to the same around these obstructions may permit the use of a single cable across multiple weapon stations without damaging the cable assembly. Conventionally, cable assemblies that do not swivel, may be permanently configured for the specific weapon station they will be mated to. This singular application can result in the need for several cables to perform the same field tasks that could be performed with one embodiment of the present invention. A single adjustable and rotatable cable and connector assembly instead of multiple cable and connector assemblies may permit decreased weight to a test kit, such as those used on the flight line. Further, the adjustable cable and connector assembly can decrease testing time in the field for an aircraft maintainer. The reduction in cables afforded by a rotatable assembly in accordance with the present invention may reduce the initial and maintenance costs of test kits which in include the same.

Other applications, which could benefit from the present invention, include testing of weapons systems. Cable assemblies that do not have the swivel feature may have to be configured for the specific weapon station they will be mated to. This can result in the need for several cables to perform the same task as one with an adjustment feature. Being able to use one cable instead of multiple cables to serve the same purpose allows for decreased weight to an overall kit. It may also reduce maintainer man hours for performing on aircraft tests. Further, still, a reduction in cabling afforded by a movable harness may reduce the cost of the test kit. The present invention is readily adapted to high heat environments using material such as aluminum or stainless steel. In alternate embodiments, a lighter weight material, such as plastic may be used for the cylinder, the backshell and other components described herein. In still other embodiments, an alternate slot configuration may be desired, in accordance with the present invention. Aircraft as an on craft application is also exemplary and other applications may be desired on, for example, watercraft, land-craft, spacecraft, or missile craft.

Although embodiments for a rotatable wiring harness have been described in language specific to structural features and/or methods, it is to be understood that the appended claims are not necessarily limited to the specific features or methods described. Rather, the specific features and methods are disclosed as exemplary implementations. While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawings.

We claim:

1. A rotatable adapter wiring harness comprising:
   a backshell comprising:
      a top wall and a cylindrical sidewall; and
      a slot disposed in the sidewall of the backshell;
   a cylinder housed in the backshell, the cylinder comprising:
      a receptacle for a conduit connector;
      the receptacle aligned within outer edges of the slot;
   a cable housing conduit;
   a first end of the conduit connector connected to a first end of the cable housing conduit; and
   a second end of the conduit connector mechanically connected to the receptacle of the cylinder; and;
   an electrical connector secured to a bottom of the backshell;
   a slack in a wiring housed within the cylinder and the backshell;
   the wiring electrically connected to the electrical connector; and
   wherein, the cylinder is configured as a swivel bushing for the rotatable adapter wiring harness.

2. The harness according to claim 1, further comprising:
   a slot height greater than but nearly equal to an outside diameter of the conduit connector, configured to permit the connector to be disposed within the slot and to limit vertical displacement of the conduit connector via the slot height relative to the outside diameter of the conduit connector.

3. The harness according to claim 1, further comprising:
   external threads on the second end of the conduit connector; and
   tapped threads in the receptacle of the cylinder, sized to mate with the external threads of the second end of the conduit connector.

4. The harness according to claim 1, wherein:
   the backshell, the cylinder, and outer fittings of the conduit are made of one of aluminum or stainless steel.

5. The harness according to claim 1, further comprising:
   a coupling nut securing the electrical connector to the bottom of the backshell.

6. The harness according to claim 1, further comprising:
a slot width affording a lateral rotational displacement of the conduit connector greater than 45 degrees.

7. A method of manufacturing a rotatable wiring harness, the method comprising:
machining a slot in a backshell;
tapping a hole in a cylinder and sizing the tapped hole to receive a conduit connector:
inserting the cylinder into the backshell;
aligning the tapped hole within the slot; and
screwing the conduit connector into the tapped hole in the cylinder.

8. The method according to claim 7, further comprising:
machining a slot height nearly equal to a conduit connector diameter, wherein lateral rotational displacement within the slot is afforded and vertical movement within the slot is limited.

9. The method according to claim 8, further comprising:
machining a slot width which affords a lateral rotational displacement of the conduit connector within the slot of at least 90 degrees.

10. The method according to claim 9, further comprising:
forming a front edge of the slot as a first lateral rotational stop.

11. The method according to claim 10, further comprising:
forming a back edge of the slot as a second lateral rotational stop.

12. A helical rotatable wiring harness comprising:
a backshell comprising:
    a top wall and a cylindrical sidewall;
    a helical slot disposed in the sidewall of the backshell;
a cylinder housed in the backshell, the cylinder comprising:
    a receptacle for a conduit connector;
    the receptacle aligned within outer edges of the slot;
a cable housing conduit;
a first end of the conduit connector connected to a first end of the cable housing conduit;
a second end of the conduit connector mechanically connected to the receptacle of the cylinder; an electrical connector secured to a bottom of the backshell;
a slack in a wiring housed within the cylinder and the backshell;
the wiring electrically connected to the electrical connector; and
wherein, the cylinder is configured as a swivel bushing for the helical rotatable wiring harness.

13. The harness according to claim 12, further comprising:
a slot height greater than but nearly equal to an outside diameter of the conduit connector, configured to permit the conduit connector to be disposed within the slot and to limit translation of the conduit connector to a helical path along the slot.

14. The harness according to claim 12, further comprising:
external threads on the second end of the conduit connector; and
tapped threads in the receptacle of the cylinder, sized to mate with the external threads of the second end of the conduit connector.

15. The harness according to claim 14, further comprising:
a coupling nut securing the electrical connector to the bottom of the backshell;
an internal collar on a top side of the coupling nut;
an external edge on a bottom portion of the backshell;
internal threads on a bottom portion of the coupling nut;
external threads on an upper portion of the electrical connector; and
wherein, the internal threads of the bottom portion of the coupling nut mate with the external threads on the upper portion of the electrical connector and the internal collar catches the external edge on a bottom portion of the backshell.

16. The harness according to claim 12, wherein:
a first external edge having a first diameter on the electrical connector juxtaposition an external bottom edge of the backshell when the helical rotatable wiring harness is assembled; and
a second external edge on the electrical connector having a second diameter greater than the first diameter on the electrical connector juxtaposition a bottom edge of the coupling nut when the helical rotatable wiring harness is assembled.

17. The harness according to claim 16, further comprising:
a second external edge on the electrical connector beneath the first external edge; and
wherein a bottom edge of the coupling nut is in close proximity to the second external edge or juxtaposition to the second external edge when the harness is assembled.

18. The harness according to claim 16, further comprising:
a first o-ring disposed between an outer surface of a sidewall of the cylinder and an inner surface of the sidewall of the backshell; and
a second o-ring disposed between an inner surface of a sidewall of the coupling nut and an outer surface of the sidewall of the backshell.

19. A rotatable window wiring harness comprising:
a backshell comprising:
    a top wall and a cylindrical sidewall;
    a window slot disposed in the sidewall of the backshell; and
    a height of the window slot greater than an external diameter of a conduit connector;
a cylinder housed in the backshell, the cylinder comprising:
    a receptacle for the conduit connector;
    the receptacle aligned within outer edges of the slot:
a cable housing conduit;
a first end of the conduit connector connected to a first end of the cable housing conduit: and
a second end of the conduit connector mechanically connected to the receptacle of the cylinder; an electrical connector secured to a bottom of the backshell;
a slack in a wiring housed within the cylinder and the backshell;
the wiring electrically connected to the electrical connector; and
wherein, the cylinder is configured as a swivel bushing for the rotatable window wiring harness.

20. The harness according to claim 19, further comprising:
a retaining ring fixed to an inside of the backshell configured to act as a bottom vertical stop for the cylinder.

21. The harness according to claim 19, further comprising:
a coupling nut securing the electrical connector to the bottom of the backshell;
an internal collar on a top side of the coupling nut;
an external edge on a bottom portion of the backshell;
internal threads on a bottom portion of the coupling nut;
external threads on an upper portion of the electrical connector; and
wherein, the internal threads of the bottom portion of the coupling nut mate with the external threads on the upper portion of the electrical connector and the internal collar catches the external edge on a bottom portion of the backshell.

22. The harness according to claim 19, further comprising:
a front edge of the window slot configured to form a first lateral rotational stop; and
a back edge of the window slot configured to form a second lateral rotational stop.

23. The harness according to claim 19, further comprising:
a first external edge having a first diameter on the electrical connector juxtaposition an external bottom edge of the backshell when the rotatable window wiring harness is assembled; and
a second external edge on the electrical connector having a second diameter greater than the first diameter on the electrical connector juxtaposition a bottom edge of the coupling nut when the rotatable window wiring harness is assembled.

24. The harness according to claim 19, further comprising:
a first set of anti-rotational teeth on a bottom edge of the backshell; and
a second set of anti-rotational teeth on an upper external edge of the electrical connector.

25. The harness according to claim 19, wherein:
the cylinder and the backshell are made of plastic.

26. The harness according to claim 19, wherein:
the cylinder and the backshell are made from one of aluminum or stainless steel.

27. A method of swiveling a rotatable adapter wiring harness, the method comprising:
acquiring a wiring harness assembly comprising:
an electrical connector secured to a bottom of a backshell;
a slot in the backshell; and
a conduit secured into a tapped hole in a cylinder, wherein the cylinder is housed in the backshell; and
rotating the conduit secured to the cylinder through the slot in the backshell between a front edge of the slot and a back edge of the slot.

28. The method of claim 27, further comprising:
rotating a conduit until a conduit fitting edge meets the front edge of the slot.

29. The method of claim 27, further comprising:
rotating a conduit until a conduit fitting edge meets the back edge of the slot.

30. A method of swiveling a rotatable adapter wiring harness, the method comprising
acquiring a wiring harness, the wiring harness comprising:
a slot in a backshell;
a cylinder housed in the backshell;
a cable conduit housing a cable and secured perpendicular to the cylinder and extending through the slot; and
an electrical connector connected to the cable and fixed to a bottom of the backshell; and
using the cylinder as a swivel bushing to swivel the rotatable adapter wiring harness.

31. The method according to claim 30, further comprising:
rotating the conduit secured to the cylinder within an opening of the slot.

32. The method according to claim 31, further comprising:
limiting a vertical displacement of the conduit connector via a slot height wherein the slot height is near a conduit connector diameter.

33. The method according to claim 30, further comprising:
using a front edge of the slot as a first lateral rotational stop; and
using a back edge of the slot as a second lateral rotational stop.

34. The method according to claim 30, further comprising:
using a slot width which affords a lateral rotational displacement of the conduit connector within the slot of at least 45 degrees.

35. The method according to claim 30, further comprising:
using a slack in the cable extending from the conduit connector to the electrical connector and housing the cable extended from the conduit connector to the electrical connector in the cylinder and the backshell.

36. A method of swiveling a window wiring harness, the method comprising:
acquiring a wiring harness, the wiring harness comprising:
a slotted backshell;
a cylinder housed in the backshell;
a cable conduit housing a cable and secured perpendicular to the cylinder and extending through the slot; and
an electrical connector connected to the cable and fixed to a bottom of the backshell;
turning the cable conduit and swiveling the cylinder to swivel the window wiring harness; and
using a slot height which affords a vertical displacement of the conduit connector within the slot.

37. The method according to claim 36, further comprising:
rotating the conduit secured to the cylinder within the slot opening.

38. The method according to claim 36, further comprising:
using a top edge of the slot as a first vertical stop.

39. The method according to claim 36, further comprising:
using a bottom edge of the slot as a second vertical stop.

40. The method according to claim 36, further comprising:
using a front edge of the slot as a first lateral rotational stop.

41. The method according to claim 36, further comprising:
using a back edge of the slot as a second lateral rotational stop.

42. The method according to claim 36, further comprising:
using a slot width which affords a lateral rotational displacement of the conduit connector within the slot of at least 90 degrees.

43. The method according to claim 36, further comprising:
using a slack in the cable extending from the conduit connector to the electrical connector and housing the cable extended from the conduit connector to the electrical connector in the cylinder and the backshell.

44. A method of rotating a wiring harness in a helical path, the method comprising:
acquiring a wiring harness comprising:
a helical slot disposed in a backshell;
a cylinder housed in the backshell;
a cable conduit housing a cable and joined perpendicular to the cylinder and extending through the slot; and
an electrical connector connected to the cable and fixed to a bottom of the backshell; and
turning the cable conduit relative to the electrical connector and translating a cable conduit connector along the helical slot.

45. The method according to claim 44, further comprising:
using the cylinder as a swivel bushing.

46. The method according to claim 45, further comprising:
enabling a vertical displacement of the conduit connector from the electrical connector along a helical path of the helical slot; and
limiting a helical slot height near the diameter of the conduit connector.

47. The method according to claim 46, further comprising:
using a top edge of the slot as a first vertical stop; and
using a bottom edge of the slot as a second vertical stop.

48. The method according to claim 46, further comprising:
using a front edge of the slot as a first lateral helical stop, and
using a back edge of the slot as a second lateral helical stop.

49. The method according to claim 46, further comprising:
preventing rotation of the backshell with respect to the electrical connector.

50. The method according to claim 49, further comprising:
using a first set of anti-rotational teeth on a bottom edge of the backshell; and
using a second set of anti-rotational teeth on an upper edge of the electrical connector.

51. The method according to claim 46, further comprising:
using a slot width which affords a lateral rotational displacement of the conduit connector within the helical slot of at least 90 degrees.

52. The method according to claim 46, further comprising:
using a slack in the cable extended from the conduit connector to the electrical connector; and
housing the cable extended from the conduit connector to the electrical connector in the cylinder and the backshell.

53. A method of manufacturing a rotatable adapter wiring harness, the method comprising:
machining a slot in a backshell;
tapping a hole in a cylinder, sized to receive a cable conduit connector;
inserting the cylinder into the backshell;
aligning the tapped hole within the machined slot in the backshell;
screwing the cable conduit connector into the tapped hole in the cylinder;
catching a backshell ledge on an upper collar of a coupling nut;
configuring an inside diameter backshell profile at a bottom end of the backshell to equal an outside diameter profile of an electrical connector at a top end of the electrical connector;
inserting the top end of the electrical connector into the bottom end of the backshell;
mating external threads on an electrical connector to internal threads of a lower portion of the coupling nut; and
securing the electrical connector to the backshell via the coupling nut.

54. The method according to claim 53, further comprising:
chamfering a bottom edge of the cylinder.

55. The method according to claim 53, further comprising:
machining a slot height nearly equal to but greater than a conduit connector diameter.

56. The method according to claim 53, further comprising:
extending a cable from the conduit connector to the electrical connector, housing the extended cable in the cylinder and the backshell, and electrically connecting the cable to the electrical connector, and
providing a slack in the cable housed within the cylinder and the backshell.

57. The method according to claim 53, further comprising:
machining a slot width which affords a lateral rotational displacement of the conduit connector within the slot of at least 90 degrees.

58. The method according to claim 53, further comprising:
forming a front edge of the slot configured as a first lateral rotational stop for the cylinder.

59. The method according to claim 53, further comprising:
forming a back edge of the slot configured as a second lateral rotational stop for the cylinder.

60. The method according to claim 53, further comprising:
connecting a conduit to the cable conduit connector;
housing a cable in the conduit;
extending a cable from the conduit connector to the electrical connector, housing the extended cable in the cylinder and the backshell, and electrically connecting the cable to the electrical connector; and
providing a slack in the cable housed within the cylinder and the backshell.

61. A method of manufacturing a rotatable helical wiring harness, the method comprising:
machining a helical slot in a backshell;
tapping a hole in a cylinder, sized to receive a cable conduit connector;
inserting the cylinder into the backshell;
aligning the tapped hole within slot in backshell;
screwing the conduit connector into the tapped hole in the cylinder;
catching a backshell ledge on an upper collar of a coupling nut;
configuring an inside diameter backshell profile at a bottom end of the backshell to equal an outside diameter profile of an electrical connector at a top end of the electrical connector;
inserting the top end of the electrical connector into the bottom end of the backshell;
mating external threads on an electrical connector to internal threads of a lower portion of the coupling nut; and
securing the electrical connector to the backshell via the coupling nut, extending a cable from the cable conduit connector to the electrical connector, housing the extended cable in the cylinder and the backshell, and electrically connecting the cable to the electrical connector; and
providing a slack in the cable housed within the cylinder and the backshell.

62. The method according to claim 61, further comprising:
inserting an o-ring in an inside surface of the coupling nut to mate with an inside surface of the backshell.

63. The method according to claim 61, further comprising:
mating external threads on the electrical connector to internal threads of a lower portion of the coupling nut; and
securing the electrical connector to the backshell via the coupling nut.

64. The method according to claim 61, further comprising:
chamfering a bottom edge of the cylinder.

65. The method according to claim 61, further comprising:
cutting a channel in a bottom portion of the cylinder in its outside surface.

66. The method according to claim 65, further comprising:
inserting an o-ring in the cut channel in the bottom portion of the cylinder channel.

67. The method according to claim 61, further comprising:
machining a slot height nearly equal to a conduit connector diameter.

68. The method according to claim 61, further comprising:
machining a helical slot which affords a lateral displacement of the conduit connector along a helical slot path.

69. The method according to claim 67, further comprising:
limiting a vertical displacement of the conduit connector via a length of the helical path.

70. The method according to claim 68, further comprising:
forming a front edge of the helical slot, configured as a first lateral displacement stop for the cylinder.

71. The method according to claim 70, further comprising:
using a back edge of the helical slot as a second lateral displacement stop.

72. A method of manufacturing a window wiring harness, the method comprising:
- machining a window slot in a backshell tapping a hole in a cylinder, sized to receive a cable conduit connector;
- inserting the cylinder into the backshell;
- aligning the tapped hole within the backshell slot;
- screwing the cable conduit connector into the tapped hole in the cylinder;
- catching a backshell ledge on an upper collar of a coupling nut;
- inserting a retaining ring into a bottom inside of the backshell beneath a bottom edge of the cylinder;
- inserting the electrical connector top into the bottom of the backshell; and
- securing the electrical connector to the backshell via the coupling nut.

73. The method according to claim 72, further comprising:
- configuring an inside diameter backshell profile at a bottom end of the backshell to equal an outside diameter profile of an electrical connector at a top end of the electrical connector.

74. The method according to claim 72, further comprising:
- inserting an o-ring in an inside surface of the coupling nut to mate with an outside surface of the backshell.

75. The method according to claim 72, further comprising:
- mating external threads on an electrical connector to internal threads of a lower portion of the coupling nut.

76. The method according to claim 72, further comprising:
- chamfering a bottom edge of the cylinder.

77. The method according to claim 72, further comprising:
- cutting a channel in a bottom portion of the cylinder on an outside surface of the cylinder, and
- inserting an o-ring in the cut channel in the bottom portion of the cylinder.

78. The method according to claim 72, further comprising:
- machining a slot height in excess of a conduit connector diameter and affording vertical displacement of the conduit connector via the slot height of the window slot.

79. The method according to claim 72, further comprising:
- machining a slot width which affords a lateral rotational displacement of the conduit connector within the window slot;
- using a front edge of the window slot as a first lateral rotational stop; and
- using a back edge of the slot as a second lateral rotational stop.

80. The method according to claim 79, further comprising:
- using a top edge of the window slot as a first vertical displacement stop; and
- using a bottom edge of the slot as a second vertical displacement stop.

81. The method according to claim 72, further comprising:
- using an inside top surface of the backshell as a first vertical displacement stop against an outside top surface of the cylinder.

82. The method according to claim 72, further comprising:
- inserting a retaining ring on an inside of the backshell beneath a bottom edge of the cylinder configured as a second vertical displacement stop against a bottom edge of the cylinder.

83. A rotatable adapter wiring harness comprising:
- a backshell comprising:
- a top wall and a cylindrical sidewall;
- anti-rotational teeth on a bottom edge of the cylindrical sidewall; and
- a slot disposed in the sidewall of the backshell;
- a cylinder housed in the backshell, the cylinder comprising:
- a receptacle for a conduit connector;
- the receptacle aligned within outer edges of the slot;
- a cable housing conduit;
- a first end of the conduit connector connected to a first end of the cable housing conduit; and
- a second end of the conduit connector mechanically connected to the receptacle of the cylinder; and;
- an electrical connector secured to a bottom of the backshell;
- a slack in a wiring housed within the cylinder and the backshell;
- the wiring electrically connected to the electrical connector; and
- wherein, the cylinder is configured as a swivel bushing for the rotatable adapter wiring harness.

84. The harness according to claim 83, further comprising:
- a second anti-rotational teeth set disposed on an upper edge of the electrical connector.

85. The harness according to claim 84, further comprising:
- a first inner diameter of the backshell at a bottom edge of the backshell, the first diameter fitting around an outer diameter of a top the electrical connector; and
- a second inner diameter of the backshell smaller than the first diameter, the second diameter disposed above the first diameter.

86. The harness according to claim 85, further comprising:
- a ramp decrease in inner diameter from the first inner diameter to the second inner diameter of the backshell.

* * * * *